United States Patent
Owens

(10) Patent No.: US 7,699,991 B2
(45) Date of Patent: *Apr. 20, 2010

(54) APPARATUS AND PROCESS FOR WATER CONDITIONING

(76) Inventor: Samuel Rupert Owens, 4801 Baldwin Blvd., Corpus Christi, TX (US) 48408

(*) Notice: Subject to any disclaimer, the term of this patent is extended or adjusted under 35 U.S.C. 154(b) by 264 days.

This patent is subject to a terminal disclaimer.

(21) Appl. No.: 11/879,656

(22) Filed: Jul. 17, 2007

(65) Prior Publication Data

US 2008/0023409 A1 Jan. 31, 2008

Related U.S. Application Data

(63) Continuation-in-part of application No. 11/645,875, filed on Dec. 27, 2006, now Pat. No. 7,658,855, which is a continuation-in-part of application No. 11/085,337, filed on Mar. 21, 2005, now Pat. No. 7,157,008.

(60) Provisional application No. 60/568,134, filed on May 5, 2004, provisional application No. 60/648,097, filed on Jan. 28, 2005.

(51) Int. Cl.
*C02F 1/58* (2006.01)
*C02F 5/02* (2006.01)

(52) U.S. Cl. .................. 210/709; 210/697; 210/712; 210/714; 210/727; 210/728; 210/743; 210/746; 210/96.1; 210/143; 210/167.3; 210/195.1; 210/199; 210/206; 422/3; 422/17; 422/18

(58) Field of Classification Search .............. 210/709
See application file for complete search history.

(56) References Cited

U.S. PATENT DOCUMENTS

| 3,639,645 A | 2/1972 | Miller et al. |
| 3,753,741 A | 8/1973 | Whitehurst et al. |
| 3,805,880 A | 4/1974 | Lawlar |
| 4,532,045 A | 7/1985 | Littmann |
| 5,045,211 A | 9/1991 | Hamilton |
| 5,200,106 A | 4/1993 | Hoots et al. |
| 5,401,419 A | 3/1995 | Kocib |

(Continued)

OTHER PUBLICATIONS

May 1999, DuPont—Technical Information.

(Continued)

*Primary Examiner*—Peter A Hruskoci
(74) *Attorney, Agent, or Firm*—George S. Gray

(57) ABSTRACT

A conditioning process and equipment are provided for removing hardness from water circulated in a system. A sidestream from such system is routed to a reaction chamber and back to the system. A conditioner is added to the sidestream water and in some embodiments is routed through a sidestream inlet from the top of the reaction chamber to its lower portion in a swirling motion. A buffer is added to the sidestream exiting the reaction chamber, and in some embodiments is added upstream of a pH sensor. In some embodiments a polymer is added. A fluid bed develops in the reaction chamber consisting of conditioner, buffer, precipitated solids and sidestream water. An upper outlet on the reaction chamber regulates the height of the fluid bed, and a drain provides for periodic discharge of the lower fluid bed. In some embodiments, a corrosion inhibitor blend is pre-mixed with the buffer.

68 Claims, 19 Drawing Sheets

U.S. PATENT DOCUMENTS

| | | | |
|---|---|---|---|
| 5,730,879 | A | 3/1998 | Wilding et al. |
| 5,776,352 | A | 7/1998 | Vanlaer |
| 6,156,129 | A | 12/2000 | Hlivka et al. |
| 7,157,008 | B2 * | 1/2007 | Owens ........................ 210/709 |
| 2002/0046976 | A1 | 4/2002 | Shimura et al. |

OTHER PUBLICATIONS

Nov. 1999, DuPont—Glyclean XL—Chemical Water Treatment Technology.

Paper—Potassium Citrate-Citric Acid Solution: In Vitro Dissolution of CalciumStones and Effect on Normal CAT Ureters (Sunga, et al.), Dec. 28, 2003.

Dec. 28, 2003, Paper—Softening (EES 4202—Lecture #7).

2003, Paper—Module 2—Water Softening (SmartPros Ltd.).

Dec. 28, 2003, Website Article—Chemical Precipitation (Everythingaboutwater.com).

Jun. 1998, Tech Brief—Lime Softening (National Drinking Water Clearinghouse).

1997, Technifax—Conditioning Water Chemically (Nalco Chemical Company).

Jan. 1997, Technical Data Sheet—Dicarboxylic Acid Mixture (BASF Corporation—Chemicals Division).

2000, "xrefer"—dicarboxylic acid.

Jan. 4, 2004, Paper—Thomas B. Williams Water Treatment Plant; (www.w-ww.com/plants/usa/florida/lakeland).

Apr. 24, 2004, Technical Website Article—Evaporative Cooling Equipment Review (www.aquacraft.com/calfed/coolers.htm).

* cited by examiner

APPARATUS AND PROCESS FOR WATER CONDITIONING

CROSS-REFERENCE TO RELATED APPLICATIONS

This application is a continuation-in-part application of U.S. patent application Ser. No. 11/645,875, filed Dec. 27, 2006, now U.S. Pat. No. 7,658,855 which is a continuation-in-part of parent application U.S. patent application 11/085,337, filed Mar. 21, 2005, now issued as U.S. Pat. No. 7,157,008, which cross-referenced U.S Provisional Patent Application Ser. No. 60/568,134, filed May 5, 2004, and U.S. Provisional Patent Application Ser. No. 60/648,097 filed Jan. 28, 2005, the inventor for all applications being Samuel Rupert Owens. The forgoing applications and patent are incorporated herein by reference.

BACKGROUND OF THE INVENTION

1. Field of the Invention

The field of the invention is water treatment, or, more specifically, my invention relates to the treatment of water used in systems wherein water is circulated for repeated use, such as evaporative cooling systems.

2. Description of Related Art

Evaporative cooling water is used to cool various liquids or gases, in cooling systems using an evaporative cooling unit, a heat exchanger and a source of makeup water piped together in a circulating line. The heat exchanger warms the circulating water, which is circulated back to the cooling tower. The warmed water cascades down inside the cooling tower, and cools by evaporation, due to the fresh air flowing counter-current through the tower fill section.

Such evaporative cooling systems, of which cooling towers are one example, operate on the principle that the latent heat of vaporization of the water being evaporated subtracts energy from the system, thus, reducing the temperature of the remaining water in the system. Only some of the water is evaporated, however, and the salts in the remaining water are manifested in increasing dissolved solids. The most common dissolved salts in domestic water are bicarbonates, chlorides, and sulfates of calcium, magnesium and sodium. When a water containing calcium bicarbonate is heated, as in cooling of air conditioning systems or other equipment, the heat in the heat exchanger, will strip off one molecule of carbon dioxide, rendering the remaining calcium salt to calcium carbonate (limestone), also known as "scale." This precipitate, the scale, is less soluble in warm water than in cool water and has very poor thermal conductivity, thus reducing heat exchanger efficiency. The scale also becomes less soluble as the pH of the circulating water increases. A higher rate of solids precipitation occurs in a high pH environment. To maintain a concentration of solids that reduces the formation of scale, fresh water is added from the makeup water source to replace the water lost due to evaporation. Also, water with high concentrations of solids are "wasted" or "blown down" through the system drain to a sewer or ditch, and this must be replaced with makeup water as well.

Total makeup water volume is the sum of evaporated water (E) plus blowdown water (BD). For evaporative cooling systems a "concentration ratio" (CR) is defined as the volume of makeup water divided by the volume of blowdown water. A large concentration ratio is achieved through reduction in the blowdown volume. Restated for blowdown volume, the equation is:

$$BD = E/(CR-1)$$

Several processes are used to chemically treat evaporative cooling water in order to reduce scale, a number of which are discussed in U.S. Pat. No. 5,730,879. Various combinations of chemicals and inorganic acids are used, but, for example, the current state-of-the-art limits a cooling system using makeup water with 150 parts per million hardness, to a concentration ratio of less than 6, when the total circulating system has a total maximum alkalinity of 600 ppm. In this situation, a cooling tower evaporating 5 million gallons of water per day, with a concentration ratio of 6, wastes 1 million gallons of water per day. In such a system, the blowdown water usually contains between 600 and 900 ppm hardness, and requires blowdown after approximately 6 volumes of system water have been evaporated (referred to as "cycles of concentration").

U.S. Pat. No. 5,730,879, referenced above, utilizes a sidestream system for treating a portion of the total evaporative cooling water, in an effort to reduce scale formation at the heat exchanger. Cation resin is used to remove water hardness. The resin beads must be regenerated with salt, acid or caustic (depending on the resin used), and then water washed to remove calcium ions. The regeneration solutions become the blowdown.

Other known treatments add chemicals directly into the primary circulation line and have some success in lowering scale formation and increasing the concentration ratio and cycles of concentration. The additive most commonly used is sulfuric acid, which converts calcium carbonate into the more soluble calcium sulfate. Both calcium carbonate and calcium sulfate precipitate more readily as the temperature of the evaporative cooling water increases. In addition, the relatively high concentration of sulfuric acid renders it potentially corrosive. Sulfuric acid can also be hazardous to handle.

While the foregoing processes and treatments may function generally with respect to the purposes for which they were designed, they would not be as suitable for the purposes of the present invention, as hereinafter described. For example, such processes do not provide what is needed, that is an effective process for reducing the amount of blowdown water and scale formation at the heat exchanger, using relatively small amounts of chemicals.

SUMMARY OF THE INVENTION

The present invention overcomes the shortcomings of the prior art by providing apparatus and processes for conditioning evaporative cooling water, wherein the amount of evaporative cooling system blowdown water is reduced. Calcium is in a chemical form that is more soluble. Scale removal at the heat exchanger is achieved using relatively small amounts of chemicals.

In some exemplary embodiments of my invention, I have provided a process for conditioning water, the water being circulated in a system, comprising the steps of: establishing a circulated water sidestream, from the system, to a reaction chamber, and back to the system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion; adding a buffer to the sidestream water exiting the reaction chamber, such that the pH of the sidestream water is lowered prior to returning to the system circulation, at least some of the buffered sidestream water being re-circulated in the sidestream; adding a conditioner to the reaction chamber lower portion, such that the pH of the sidestream water is elevated; the conditioner and buffer being added such that mixing of the conditioner, the buffer and the sidestream water within the reaction chamber, causes solids to precipitate from the sidestream water such that the sidestream water exiting the reaction chamber has less dissolved solids than the sidestream water entering the reaction chamber; and removing precipitated solids, conditioner, buffer and some of the sidestream water from the reaction chamber for disposal.

In some exemplary embodiments of my invention, the step of adding a conditioner to the reaction chamber lower portion further comprises the step of routing the conditioner through a conduit extending through at least a portion of the inlet. In some exemplary embodiments of my invention, the process further comprises the step of causing a swirling of the sidestream water as the sidestream water is being routed through the reaction chamber upper portion. In some exemplary embodiments of my invention, the process further comprises the step of adding a polymer to the sidestream water in the inlet.

In some exemplary embodiments of my invention, the reaction chamber comprises an upper outlet for discharging the sidestream water back to the system, the process further comprising the step of monitoring the pH of the water returning to the system circulation using a pH sensor, the step of adding a buffer to the sidestream water further comprising the step of adding the buffer to the sidestream water at a point between the reaction chamber and the pH sensor. In some exemplary embodiments of my invention, the reaction chamber comprises a tank, the tank having an upper outlet through which sidestream water is discharged for returning to the system circulation, the step of adding a buffer to the sidestream water further comprising adding the buffer to the sidestream water at a point proximate the tank upper outlet.

In some exemplary embodiments of my invention, the process further comprises the step of adding a polymer to the sidestream water. In some exemplary embodiments of my invention, the amount of polymer added results in a polymer to sidestream circulation water concentration in the range of 0.4-0.75 ppm. In some exemplary embodiments of my invention, the amount of polymer added is sufficient to substantially clarify sidestream water prior to the sidestream water being circulated back to the system circulation.

In some exemplary embodiments of my invention: the sidestream water being circulated to the reaction chamber has a total hardness; the process further comprises the step of electronically measuring the hardness; the sidestream water being circulated to the reaction chamber contains polymer-combinable particles, the particles interfering with the electronic hardness measurement accuracy and causing measurement inaccuracy; and the amount of polymer added is sufficient to combine with and remove at least some of the interfering particles, such that the electronic hardness measurement accuracy is improved.

In some exemplary embodiments of my invention: the sidestream water being circulated back to the cooling water system from the reaction chamber has a total hardness; the process further comprises the step of chemically measuring the hardness; the sidestream water being circulated back to the cooling water system from the reaction chamber contains polymer-combinable particles, the particles interfering with the chemical hardness measurement accuracy and causing measurement inaccuracy; and the amount of polymer added is sufficient to combine with and remove at least some of the interfering particles, such that the chemical hardness measurement accuracy is improved.

In some exemplary embodiments of my invention, the polymer is pre-mixed with a polymer reaction accelerator additive. In some exemplary embodiments of my invention, the additive is selected from the group consisting of aluminum sulfate, aluminum chloride, ferric sulfate, and ferric chloride.

In some exemplary embodiments of my invention, the step of adding a conditioner to the reaction chamber lower portion further comprises routing the conditioner through a conduit extending through at least a portion of the inlet, and the step of adding a polymer to the sidestream water, further comprises the step of adding the polymer to the sidestream water in the reaction chamber inlet. In some exemplary embodiments of my invention, the process further comprises the step of causing a swirling of the sidestream water as the sidestream water is being routed through the reaction chamber inlet.

In some exemplary embodiments of my invention, the reaction chamber comprises an upper outlet for discharging the sidestream water back to the system, and the step of removing precipitated solids, conditioner, buffer and some of the sidestream water from the reaction chamber for disposal further comprises removing the precipitated solids, conditioner, buffer and some of the sidestream water from the reaction chamber through a lower outlet. In some exemplary embodiments of my invention, the process further comprises the step of periodically draining part of the mixture of precipitated solids, conditioner, buffer, and some of the sidestream water through a drain on the reaction chamber.

In some exemplary embodiments of my invention, the process further comprises the step of adding a corrosion inhibitor blend to the sidestream water. In some exemplary embodiments of my invention, the corrosion inhibitor blend comprises approximately 30 percent orthophosphate and 70 percent polyphosphate in a 50 percent water solution. In some exemplary embodiments of my invention, the step of adding a buffer to the sidestream water exiting the reaction chamber, further comprises the step of adding a corrosion inhibitor blend to the buffer before the buffer is added to the sidestream water. In some exemplary embodiments of my invention, the corrosion inhibitor blend comprises approximately 30 percent orthophosphate and 70 percent polyphosphate in a 50 percent water solution, and the ratio of corrosion inhibitor blend to buffer is approximately 500 milliliters to 19 liters. In some exemplary embodiments of my invention, the corrosion inhibitor blend comprises approximately 30 percent orthophosphate and 70 percent polyphosphate in a 50 percent water solution, and the ratio of corrosion inhibitor blend to buffer is approximately 1 liter to 19 liters. In some exemplary embodiments of my invention, the process further comprises the step of adding a corrosion inhibitor blend to the sidestream water, in amounts such that the mixture of the precipitated solids, conditioner, buffer and sidestream water removed from the reaction chamber for disposal, is softened. In some exemplary embodiments of my invention, the process further comprises the steps of periodically draining part of the mixture of precipitated solids, conditioner, buffer, and some of the sidestream water through a drain on the reaction chamber, and adding a corrosion inhibitor blend to the sidestream water, in amounts such that the mixture of the precipitated solids, conditioner, buffer and sidestream water drained from the reaction chamber through the drain, is softened.

In some exemplary embodiments of my invention, the water being circulated in the system has a total hardness, and the process further comprises the step of adjusting the circulated water hardness by altering the amount of conditioner added. In some exemplary embodiments of my invention, the step of adjusting the circulated water hardness by altering the amount of conditioner added, further comprises the steps of: electronically measuring the hardness; and electronically adjusting the amount of conditioner added, in response to the hardness measurement. In some exemplary embodiments of my invention, the water being circulated in the system has a total hardness, the process further comprising the step of adjusting the circulated water hardness by altering the amount of buffer added. In some exemplary embodiments of my invention, the step of adjusting the circulated water hardness by altering the amount of buffer added, further comprises the steps of: electronically measuring the hardness; and electronically adjusting the amount of buffer added, in response to the hardness measurement.

In some exemplary embodiments of my invention, I have provided a conditioning system for conditioning water, the water being circulated in another system, the conditioning system comprising: a reaction chamber; means for establishing a circulated water sidestream, from the other system, to the reaction chamber, and back to the other system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion; means for adding a buffer to the sidestream water exiting the reaction chamber, such that the pH of the sidestream water is lowered prior to returning to the other system circulation, at least some of the buffered sidestream water being re-circulated in the sidestream; means for adding a conditioner to the reaction chamber lower portion, such that the pH of the sidestream water is elevated; the conditioner and buffer being addable such that mixing of the conditioner, the buffer, and the sidestream water within the reaction chamber, causes solids to precipitate from the sidestream water such that the sidestream water exiting the reaction chamber has less dissolved solids than the sidestream water entering the reaction chamber; and means for removing precipitated solids, conditioner, buffer and some of the sidestream water from the reaction chamber for disposal.

In some exemplary embodiments of my invention, the means for adding a conditioner to the reaction chamber lower portion further comprises means for routing the conditioner through a conduit extending through at least a portion of the inlet. In some exemplary embodiments of my invention, the system further comprises means for causing a swirling of the sidestream water in the inlet as the sidestream water is being routed through the reaction chamber upper portion. In some exemplary embodiments of my invention, the system further comprises means for adding a polymer to the sidestream water in the inlet.

In some exemplary embodiments of my invention, the reaction chamber comprises an upper outlet for discharging the sidestream water back to the system, the conditioning system further comprises means for monitoring the pH of the water returning to the system circulation using a pH sensor, and the means for adding a buffer to the sidestream water further comprises means for adding the buffer to the sidestream water at a point between the reaction chamber and the pH sensor. In some exemplary embodiments of my invention, the reaction chamber comprises a tank, the tank having an upper outlet through which sidestream water is discharged for returning to the system circulation, and the means for adding a buffer to the sidestream water further comprises means for adding the buffer to the sidestream water at a point proximate the tank upper outlet.

In some exemplary embodiments of my invention, the system further comprises means for adding a polymer to the sidestream water. In some exemplary embodiments of my invention, the amount of polymer added results in a polymer to sidestream water concentration in the range of 0.4-0.75 ppm. In some exemplary embodiments of my invention, the amount of polymer added is sufficient to substantially clarify sidestream water prior to the sidestream water being circulated back to the system circulation.

In some exemplary embodiments of my invention: the sidestream water being circulated to the reaction chamber has a total hardness; the system further comprises means for electronically measuring the hardness; the sidestream water being circulated to the reaction chamber contains polymer-combinable particles, the particles interfering with the electronic hardness measurement accuracy and causing measurement inaccuracy; and the amount of polymer added is sufficient to combine with and remove at least some of the interfering particles, such that the electronic hardness measurement accuracy is improved.

In some exemplary embodiments of my invention: the sidestream water being circulated back to the cooling water system from the reaction chamber has a total hardness; the system further comprises means for chemically measuring the hardness; the sidestream water being circulated back to the cooling water system from the reaction chamber contains polymer-combinable particles, the particles interfering with the chemical hardness measurement accuracy and causing measurement inaccuracy; and the amount of polymer added is sufficient to combine with and remove at least some of the interfering particles, such that the chemical hardness measurement accuracy is improved.

In some exemplary embodiments of my invention, the polymer is pre-mixed with a polymer reaction accelerator additive. In some exemplary embodiments of my invention, the additive is selected from the group consisting of aluminum sulfate, aluminum chloride, ferric sulfate, and ferric chloride.

In some exemplary embodiments of my invention, the means for adding a conditioner to the reaction chamber lower portion further comprises means for routing the conditioner through a conduit extending through at least a portion of the inlet, and the means for adding a polymer to the side stream water further comprises means for adding the polymer to the sidestream water in the reaction chamber inlet. In some exemplary embodiments of my invention, the system further comprises means for causing a swirling of the sidestream water as the sidestream water is routed through the reaction chamber upper portion.

In some exemplary embodiments of my invention, the reaction chamber comprises an upper outlet for discharging the sidestream water back to the system, the means for removing precipitated solids, conditioner, buffer and some of the sidestream water from the reaction chamber for disposal further comprising means for removing the precipitated solids, conditioner, buffer and some of the sidestream water from the reaction chamber through a lower outlet. In some exemplary embodiments of my invention, the conditioning system further comprises means for periodically draining part of the mixture of precipitated solids, conditioner, buffer, and some of the sidestream water through a drain on the reaction chamber.

In some exemplary embodiments of my invention, the system further comprises means for adding a corrosion inhibitor blend to the sidestream water. In some exemplary embodiments of my invention, the corrosion inhibitor blend comprises approximately 30 percent orthophosphate and 70 percent polyphosphate in a 50 percent water solution. In some exemplary embodiments of my invention, the means for adding a buffer to the sidestream water exiting the reaction chamber further comprises means for adding a corrosion inhibitor blend to the buffer before the buffer is added to the sidestream water. In some exemplary embodiments of my invention, the corrosion inhibitor blend comprises approximately 30 percent orthophosphate and 70 percent polyphosphate in a 50 percent water solution, and the ratio of corrosion inhibitor blend to buffer is approximately 500 milliliters to 19 liters. In some exemplary embodiments of my invention, the corrosion inhibitor blend comprises approximately 30 percent orthophosphate and 70 percent polyphosphate in a 50 percent water solution, and the ratio of corrosion inhibitor blend to buffer is approximately 1 liter to 19 liters. In some exemplary embodiments of my invention, the system further comprises means for adding a corrosion inhibitor blend to the sidestream water, in amounts such that the mixture of the precipitated solids, conditioner, buffer and sidestream water removed from the reaction chamber for disposal, is softened. In some exemplary embodiments of my invention, the system further comprises means for periodically draining part of the mixture of precipitated solids, conditioner, buffer, and some of the sidestream water through a drain on the reaction chamber, and means for adding a corrosion inhibitor blend to the sidestream water, in amounts such that the mixture of the precipitated solids, conditioner, buffer and sidestream water drained from the reaction chamber through the drain, is softened.

In some exemplary embodiments of my invention, the water being circulated in the system has a total hardness, the conditioning system further comprising means for adjusting the circulated water hardness by altering the amount of conditioner added. In some exemplary embodiments of my invention, the means for adjusting the circulated water hardness by altering the amount of conditioner added, further comprises means for: electronically measuring the hardness; and electronically adjusting the amount of conditioner added, in response to the hardness measurement. In some exemplary embodiments of my invention, the water being circulated in the system has a total hardness, the conditioning system further comprising means for adjusting the circulated water hardness by altering the amount of buffer added. In some exemplary embodiments of my invention, the means for adjusting the circulated water hardness by altering the amount of buffer added, further comprises means for: electronically measuring the hardness; and electronically adjusting the amount of buffer added, in response to the hardness measurement.

In some exemplary embodiments of my invention, I have provided a conditioning system for conditioning water, the water being circulated in another system, the conditioning system comprising: a reaction chamber; conduit for establishing a circulated water sidestream, from the other system, to a reaction chamber, and back to the other system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion; a buffer addition system for adding a buffer to the sidestream water exiting the reaction chamber, such that the pH of the sidestream water is lowered prior to returning to the other system circulation, at least some of the buffered sidestream water being re-circulated in the sidestream; a conditioner addition system for adding a conditioner to the reaction chamber lower portion, such that the pH of the sidestream water is elevated; the conditioner and buffer being addable such that mixing of the conditioner, the buffer, and the sidestream water within the reaction chamber, causes solids to precipitate from the sidestream water such that the sidestream water exiting the reaction chamber has less dissolved solids than the sidestream water entering the reaction chamber; and an outlet for removing precipitated solids, conditioner, buffer and some of the sidestream water from the reaction chamber for disposal.

In some exemplary embodiments of my invention, the conditioner addition system further comprises a conditioner addition system conduit extending through at least a portion of the inlet, the conditioner flowing through the conditioner addition system conduit. In some exemplary embodiments of my invention, the reaction chamber lower portion has a bottom and the inlet discharges the sidestream water approximately 12 inches from the reaction chamber bottom. In some exemplary embodiments of my invention, the discharged sidestream water circulates in a substantially circular, inwardly directed pattern about the inlet.

In some exemplary embodiments of my invention, the reaction chamber lower portion has a bottom, and the reaction chamber lower portion bottom is substantially flat. In some exemplary embodiments of my invention, the reaction chamber lower portion has a bottom, and the reaction chamber lower portion bottom is substantially conical. In some exemplary embodiments of my invention, the reaction chamber lower portion has a bottom, and the reaction chamber lower portion bottom is substantially convex.

In some exemplary embodiments of my invention, the inlet is configured to receive the sidestream water and induce a swirling of the sidestream water as the sidestream water is being routed through the reaction chamber upper portion. In some exemplary embodiments of my invention, the system further comprises a polymer addition system having a polymer supply, and a polymer delivery assembly, and wherein the inlet further comprises a port for receiving the polymer from the polymer delivery assembly for addition to the sidestream water in the inlet.

In some exemplary embodiments of my invention, the reaction chamber comprises an upper outlet for discharging the sidestream water back to the other system circulation, the conditioning system further comprising a pH sensor for monitoring the pH of the water returning to the other system circulation, and further wherein the buffer is added to the sidestream water between the reaction chamber and the pH sensor. In some exemplary embodiments of my invention, the reaction chamber comprises a tank, the tank having an upper outlet through which sidestream water is discharged for returning to the other system circulation, and further the buffer is added to the sidestream water proximate the tank upper outlet.

In some exemplary embodiments of my invention, the system further comprises a polymer addition system for adding a polymer to the sidestream water. In some exemplary embodiments of my invention, the amount of polymer added results in a polymer to sidestream water concentration in the range of 0.4-0.75 ppm. In some exemplary embodiments of my invention, the amount of polymer added is sufficient to substantially clarify sidestream water prior to the sidestream water being circulated back to the system circulation.

In some exemplary embodiments of my invention: the sidestream water being circulated to the reaction chamber has a total hardness; the conditioning system further comprises a hardness measurement assembly for electronically measuring the hardness; the sidestream water being circulated to the reaction chamber contains polymer-combinable particles, the particles interfering with the electronic hardness measurement accuracy and causing measurement inaccuracy; and the amount of polymer added is sufficient to combine with and remove at least some of the interfering particles, such that the electronic hardness measurement accuracy is improved.

In some exemplary embodiments of my invention: the sidestream water being circulated back to the cooling water system from the reaction chamber has a total hardness; the conditioning system further comprises a sampling valve for obtaining sidestream water samples from sidestream water being circulated back to the cooling water system from the reaction chamber for chemically measuring the hardness; the sidestream water being circulated back to the cooling water system from the reaction chamber contains polymer-combinable particles, the particles interfering with the chemical hardness measurement accuracy and causing measurement inaccuracy; and the amount of polymer added is sufficient to combine with and remove at least some of the interfering particles, such that the chemical hardness measurement accuracy is improved.

In some exemplary embodiments of my invention, the polymer is pre-mixed with a polymer reaction accelerator additive. In some exemplary embodiments of my invention, the additive is selected from the group consisting of aluminum sulfate, aluminum chloride, ferric sulfate, and ferric chloride.

In some exemplary embodiments of my invention, the conditioner addition system further comprises a conditioner addition system conduit extending through at least a portion of the inlet, the conditioner flowing through the conditioner addition system conduit; the polymer addition system further comprises a polymer supply, and a polymer delivery assembly; and the inlet further comprises a port for receiving the polymer from the polymer delivery assembly for addition to the sidestream water in the inlet. In some exemplary embodiments of my invention, the inlet is configured to receive the sidestream water and induce a swirling of the sidestream water as the sidestream water is being routed through the reaction chamber upper portion.

In some exemplary embodiments of my invention, the reaction chamber is not internally pressurable. In some exemplary embodiments of my invention, the reaction chamber is internally pressurable.

In some exemplary embodiments of my invention, reaction chamber further comprises an upper outlet for discharging sidestream water back to the other system. In some exemplary embodiments of my invention, the system further comprises drain for periodically draining part of the mixture of precipitated solids, conditioner, buffer, and some of the sidestream water from the reaction chamber.

In some exemplary embodiments of my invention, the buffer addition system accommodates a mixture of the buffer and a corrosion inhibitor blend, the mixture being dischargeable from the buffer addition system into the sidestream water. In some exemplary embodiments of my invention, the corrosion inhibitor blend comprises approximately 30 percent orthophosphate and 70 percent polyphosphate in a 50 percent water solution. In some exemplary embodiments of my invention, the ratio of corrosion inhibitor blend to buffer is approximately 500 milliliters to 19 liters. In some exemplary embodiments of my invention, the ratio of corrosion inhibitor blend to buffer is approximately 1 liter to 19 liters. In some exemplary embodiments of my invention, the amount of corrosion inhibitor added is such that the mixture of the precipitated solids, conditioner, buffer and sidestream water removed from the reaction chamber through the outlet, is softened. In some exemplary embodiments of my invention, the system further comprises a drain for periodically draining part of the mixture of precipitated solids, conditioner, buffer, and some of the sidestream water from the reaction chamber, and wherein the amount of corrosion inhibitor added is such that the mixture of the precipitated solids, conditioner, buffer and sidestream water drained from the reaction chamber through the drain, is softened.

In some exemplary embodiments of my invention, the water being circulated in the other system has a total hardness, the conditioning system further comprising an electronic controller system for measuring such total hardness, and adjusting the circulated water hardness, in response to such measurements, by altering the amount of conditioner added. In some exemplary embodiments of my invention, the water being circulated in the other system has a total hardness, the conditioning system further comprising an electronic controller system for measuring such total hardness, and adjusting the circulated water hardness, in response to such measurements, by altering the amount of buffer added.

In some exemplary embodiments of my invention, I have provided a process for conditioning evaporative cooling water that is circulated in a cooling system of the type including a source of makeup water, an evaporative cooling unit and a heat exchanger piped together in a circulating line, the process comprising the steps of: establishing an evaporative cooling water sidestream, from the cooling system, to a reaction chamber, and back to the cooling system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion; adding a buffer to the sidestream water exiting the reaction chamber, such that the pH of the sidestream water is lowered prior to returning to the cooling system circulation, at least some of the buffered sidestream water being re-circulated in the sidestream; adding conditioner to the reaction chamber lower portion, such that the pH of the sidestream water is elevated; the conditioner and buffer being added such that a fluid bed accumulates, settles and is maintained in the reaction chamber, the fluid bed having at least conditioner, buffer, and dissolved solids precipitated from the sidestream water, the fluid bed mixing and reacting with sidestream water entering the reaction chamber such that additional solids precipitate from the sidestream water, the sidestream water thus exiting the tank with reduced dissolved solids; and removing a portion of the fluid bed from the reaction chamber for disposal.

In some exemplary embodiments of my invention, I have provided a conditioning system for conditioning evaporative cooling water that is circulated in a cooling system of the type including a source of makeup water, an evaporative cooling unit and a heat exchanger piped together in a circulating line, the conditioning system comprising: a reaction chamber; means for establishing an evaporative cooling water sidestream, from the cooling system, to the reaction chamber, and back to the cooling system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion; means for adding a buffer to the sidestream water exiting the reaction chamber, such that the pH of the sidestream water is lowered prior to returning to the cooling system circulation, at least some of the buffered sidestream water being re-circulated in the sidestream; means for adding conditioner to the reaction chamber lower portion, such that the pH of the sidestream water is elevated; the conditioner and buffer being addable such that a fluid bed accumulates, settles and is maintained in the reaction chamber, the fluid bed having at least conditioner, buffer, and dissolved solids precipitated from the sidestream water, the fluid bed mixing and reacting with the sidestream water entering the reaction chamber such that additional solids precipitate from the sidestream water, the sidestream water thus exiting the tank with reduced dissolved solids; and means for removing a portion of the fluid bed from the reaction chamber for disposal.

In some exemplary embodiments of my invention, I have provided a conditioning system for conditioning evaporative cooling water that is circulated in a cooling system of the type including a source of makeup water, an evaporative cooling unit and a heat exchanger piped together in a circulating line, the conditioning system comprising: a reaction chamber; conduit for establishing an evaporative cooling water sidestream, from the cooling system, to the reaction chamber, and back to the cooling system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion; a buffer addition system for adding a buffer to the sidestream water exiting the reaction chamber, such that the pH of the sidestream water is lowered prior to returning to the cooling system circulation, at least some of the buffered sidestream water being re-circulated in the sidestream; a conditioner addition system for adding conditioner to the reaction chamber lower portion, such that the pH of the sidestream water is elevated; the conditioner and buffer being addable such that a fluid bed accumulates, settles and is maintained in the reaction chamber, the fluid bed having at least conditioner, buffer, and dissolved solids precipitated from the sidestream water, the fluid bed mixing and reacting with the sidestream water entering the reaction chamber such that additional solids precipitate from the sidestream water, the sidestream water thus exiting the tank with reduced dissolved solids; and a fluid bed adjustment outlet for removing a portion of the fluid bed from the reaction chamber for disposal.

In some exemplary embodiments of my invention, I have provided a process for conditioning water, the water being circulated in a system, comprising the steps of: establishing a circulated water sidestream, from the system, to a reaction chamber, and back to the system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion, the inlet being further configured to cause a swirling of the sidestream water as the sidestream water is being routed through the reaction chamber upper portion; adding a buffer comprising organic acid to the sidestream water exiting the reaction chamber, such that the pH of the sidestream water is lowered prior to returning to the system circulation, at least some of the buffered sidestream water being re-circulated in the sidestream; adding a conditioner comprising caustic to the reaction chamber lower portion by routing the conditioner through a conduit extending through at least a portion of the inlet, such that the pH of the sidestream water is elevated; adding a polymer to the sidestream water in the inlet; adding a corrosion inhibitor blend to the sidestream water; the conditioner and buffer being added such that mixing of the conditioner, the buffer and the sidestream water within the reaction chamber, causes solids to precipitate from the sidestream water such that the sidestream water exiting the reaction chamber has less dissolved solids than the sidestream water entering the reaction chamber; and removing precipitated solids, conditioner, buffer and some of the sidestream water from the reaction chamber for disposal.

In some exemplary embodiments of my invention, I have provided a process for conditioning water, the water being circulated in a system, comprising the steps of: establishing a circulated water sidestream, from the system, to a reaction chamber, and back to the system circulation; adding a buffer to the sidestream water exiting the reaction chamber, such that the pH of the sidestream water is lowered prior to returning to the system circulation, at least some of the buffered sidestream water being re-circulated in the sidestream; adding a conditioner to the sidestream water before the sidestream water enters the reaction chamber, such that the pH of the sidestream water is elevated; the conditioner and buffer being added such that mixing of the conditioner, the buffer and the sidestream water within the reaction chamber, causes solids to precipitate from the sidestream water such that the sidestream water exiting the reaction chamber has less dissolved solids than the sidestream water entering the reaction chamber; and removing precipitated solids, conditioner, buffer and some of the sidestream water from the reaction chamber for disposal.

In some exemplary embodiments of my invention, the reaction chamber comprises an upper outlet for discharging the sidestream water back to the system circulation, the process further comprising the step of monitoring the pH of the water returning to the system circulation using a pH sensor, the step of adding a buffer to the sidestream water further comprising adding the buffer to the sidestream water at a point between the reaction chamber and the pH sensor. In some exemplary embodiments of my invention, the reaction chamber comprises a tank, the tank having an upper outlet through which sidestream water is discharged for returning to the system circulation, the step of adding a buffer to the sidestream water further comprising adding the buffer to the sidestream water at a point proximate the tank upper outlet.

In some exemplary embodiments of my invention, the reaction chamber comprises an inlet for receiving the sidestream water, and an upper outlet for discharging the sidestream water back to the system, the step of removing precipitated solids, conditioner, buffer and some of the sidestream water from the reaction chamber for disposal further comprising removing the precipitated solids, conditioner, buffer and some of the sidestream water from the reaction chamber through a lower outlet. In some exemplary embodiments of my invention, the process further comprises the step of periodically draining part of the mixture of precipitated solids, conditioner, buffer, and some of the sidestream water through a drain on the reaction chamber.

In some exemplary embodiments of my invention, the process further comprises the step of adding a corrosion inhibitor blend to the sidestream water. In some exemplary embodiments of my invention, the corrosion inhibitor blend comprises approximately 30 percent orthophosphate and 70 percent polyphosphate in a 50 percent water solution. In some exemplary embodiments of my invention, the step of adding a buffer to the sidestream water exiting the reaction chamber, further comprises the step of adding a corrosion inhibitor blend to the buffer before the buffer is added to the sidestream water. In some exemplary embodiments of my invention, the corrosion inhibitor blend comprises approximately 30 percent orthophosphate and 70 percent polyphosphate in a 50 percent water solution, and the ratio of corrosion inhibitor blend to buffer is approximately 500 milliliters to 19 liters. In some exemplary embodiments of my invention, the corrosion inhibitor blend comprises approximately 30 percent orthophosphate and 70 percent polyphosphate in a 50 percent water solution, and the ratio of corrosion inhibitor blend to buffer is approximately 1 liter to 19 liters. In some exemplary embodiments of my invention, the process further comprises the step of adding a corrosion inhibitor blend to the sidestream water, in amounts such that the mixture of the precipitated solids, conditioner, buffer and sidestream water removed from the reaction chamber for disposal, is softened. In some exemplary embodiments of my invention, the process further comprises the steps of periodically draining part of the mixture of precipitated solids, conditioner, buffer, and some of the sidestream water through a drain on the reaction chamber, and adding a corrosion inhibitor blend to the sidestream water, in amounts such that the mixture of the precipitated solids, conditioner, buffer and sidestream water drained from the reaction chamber through the drain, is softened.

In some exemplary embodiments of my invention, the water being circulated in the system has a total hardness, the process further comprising the step of adjusting the circulated water hardness by altering the amount of conditioner added. In some exemplary embodiments of my invention, the step of adjusting the circulated water hardness by altering the amount of conditioner added, further comprises the steps of: electronically measuring the hardness; and electronically adjusting the amount of conditioner added, in response to the hardness measurement. In some exemplary embodiments of my invention, the water being circulated in the system has a total hardness, the process further comprising the step of adjusting the circulated water hardness by altering the amount of buffer added. In some exemplary embodiments of my invention, the step of adjusting the circulated water hardness by altering the amount of buffer added, further comprises the steps of: electronically measuring the hardness; and electronically adjusting the amount of buffer added, in response to the hardness measurement.

In some exemplary embodiments of my invention, the process further comprises the step of adding a polymer to the sidestream water. In some exemplary embodiments of my invention, the amount of polymer added results in a polymer to sidestream circulation water concentration in the range of 0.4-0.75 ppm. In some exemplary embodiments of my invention, the amount of polymer added is sufficient to substantially clarify sidestream water prior to the sidestream water being circulated back to the system circulation.

In some exemplary embodiments of my invention: the sidestream water being circulated to the reaction chamber has a total hardness; the process further comprises the step of electronically measuring the hardness; the sidestream water being circulated to the reaction chamber contains polymer-combinable particles, the particles interfering with the electronic hardness measurement accuracy and causing measurement inaccuracy; and the amount of polymer added is sufficient to combine with and remove at least some of the interfering particles, such that the electronic hardness measurement accuracy is improved.

In some exemplary embodiments of my invention: the sidestream water being circulated back to the cooling water system from the reaction chamber has a total hardness; the process further comprises the step of chemically measuring the hardness; the sidestream water being circulated back to the cooling water system from the reaction chamber contains polymer-combinable particles, the particles interfering with the chemical hardness measurement accuracy and causing measurement inaccuracy; and the amount of polymer added is sufficient to combine with and remove at least some of the interfering particles, such that the chemical hardness measurement accuracy is improved.

In some exemplary embodiments of my invention, the polymer is pre-mixed with a polymer reaction accelerator additive. In some exemplary embodiments of my invention, the additive is selected from the group consisting of aluminum sulfate, aluminum chloride, ferric sulfate, and ferric chloride.

The foregoing features and advantages of my invention will be apparent from the following more particular descriptions of exemplary embodiments of the invention as illustrated, in some embodiments, in the accompanying drawings.

DETAILED DESCRIPTION OF EXEMPLARY EMBODIMENTS

The following discussion describes exemplary embodiments of the invention in detail. This discussion should not be construed, however, as limiting the invention to those particular embodiments. Practitioners skilled in the art will recognize numerous other embodiments as well. For a definition of the complete scope of the invention, the reader is directed to the appended claims.

Definitions

Figure 1:
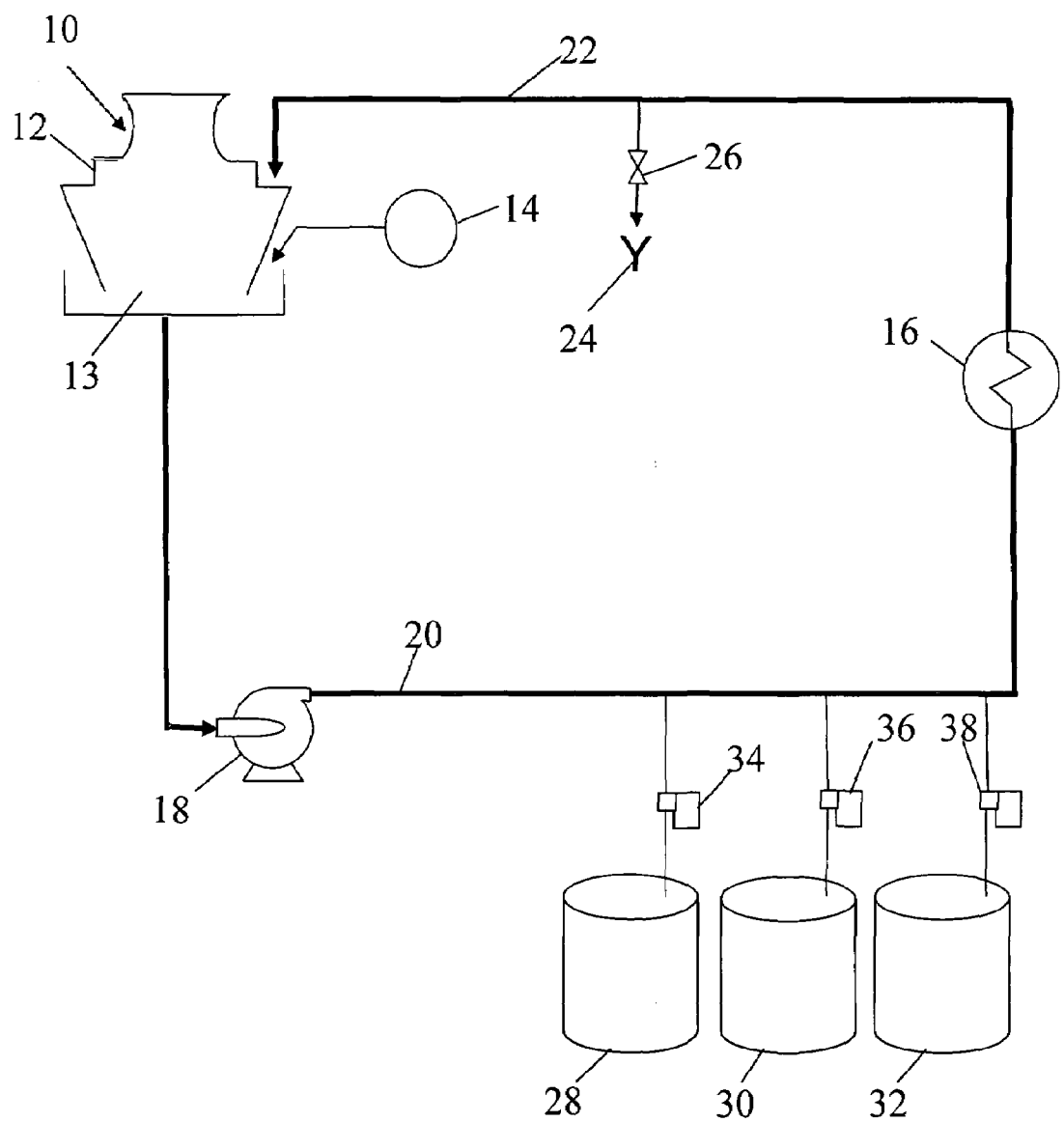
FIG. 1 is a schematic representation of a conventional evaporative cooling system of the type having a cooling tower.

As used herein, the term "evaporative cooling system" means a cooling system having at least an evaporative cooling unit (of which a cooling tower is but one example), a heat exchanger in circulatory communication with the evaporative cooling unit (by means such as circulating pipe and one or more pumps), a makeup water source (with means for adding the makeup water to the circulation), and a blowdown capability (for removing water from the circulation). A typical evaporative cooling system 10 is depicted in FIG. 1 and includes an evaporative cooling tower 12, a basin 13, and the makeup water source 14. Circulation between the cooling tower and the heat exchanger 16 is established by a pump 18 in a circulating line including a cool water supply line 20 and a warm water return line 22. Blowdown is provided through a drain 24 with a valve 26.

As used herein, the term "conditioner" is limited to, and only refers to caustic, e.g. potassium hydroxide, sodium hydroxide, ammonium hydroxide, and calcium hydroxide. Conditioner is sometimes referred to as "adjutant."

As used herein, the term "buffer" is limited to, and only refers to organic acids, such as glycolic acid, alpha-hydroxyacetic acid, acetic acid, malaic acid, tartaric acid, ascorbic acid, and citric acid.

As used herein, the term "lines" includes conduit, piping, tubular members, and the like, that are suitable for transporting liquids.

As used herein, the term "polymer" also includes copolymers, solutions of two or more polymers, and polymer blends, such as blends with reaction accelerators.

As discussed above, current water conditioning methods typically involve injecting various additives, such as inhibitors 28, dispersants 30, and acids 32, directly into the cool water supply line 20, using injector pumps 34, 36, 38.

Figure 2:
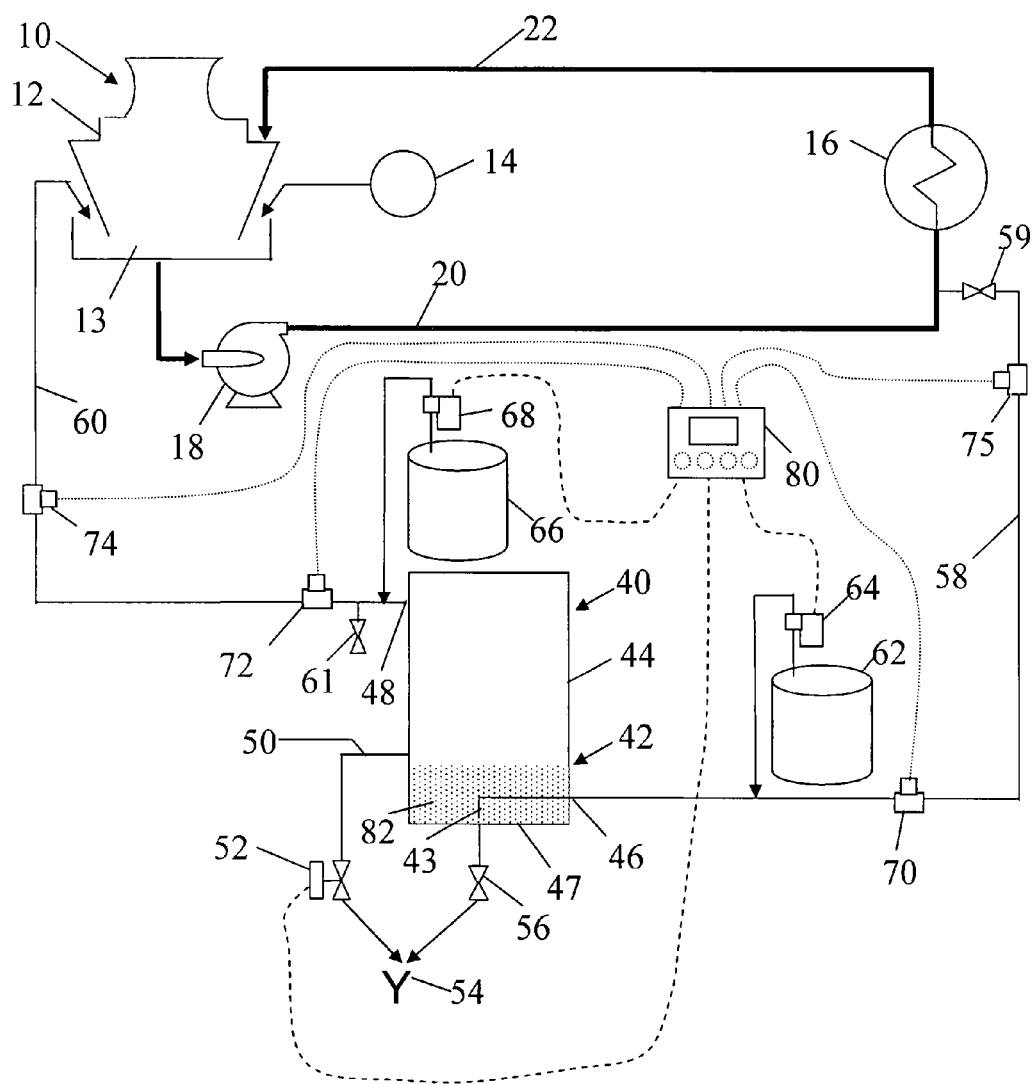
FIG. 2 is a schematic representation of an exemplary embodiment of my apparatus and process adapted to the conventional evaporative cooling system of FIG. 1.

An exemplary embodiment of the conditioning process 40 of the present invention is schematically depicted in FIG. 2. In this exemplary embodiment, the process equipment includes a reaction chamber 42 with a tank 44 having an inlet 46, an upper outlet 48, a lower outlet 50 having an electronically operated valve 52, and a drain 54 with a valve 56. A sidestream circulation is established by a supply line 58 extending from the cooling system cool water supply line 20 to the tank inlet 46, and a conditioned water return line 60 extending from the tank upper outlet 48 and finally discharging into the cooling tower basin 13. The sidestream circulation in this exemplary embodiment is approximately 0.1-0.5 percent of the total evaporative cooling water recirculation rate. A valve 59 is provided for isolating the supply line from the cooling system cool water supply line. A supply of conditioner 62 is injectable into the supply line 58 using a conventional injection pump 64. Similarly, a supply of buffer 66 is injected into the conditioned water return line 60 using injection pump 68.

In the exemplary embodiment of FIG. 2, conventional pH monitoring equipment is provided with a supply line pH monitor 70 positioned on the supply line 58, and a conditioned water return line pH monitor 72 positioned on the conditioned water return line 60 downstream from the point of buffer injection. Positioned on the conditioned water return line is a specific ion electrode (total hardness) 74 for measuring hardness of the evaporative cooling water in parts per million, and a small valve 61 (between the tank and the point of buffer injection), the small valve being used to draw samples of evaporative cooling water and observing the drawn waters clarity and measuring hardness. A conductivity monitor 75 is positioned on the supply line 58.

In this exemplary embodiment, a controller 80 is operationally connected to the conditioner injection pump 64, the buffer injection pump 68, the supply line pH monitor 70, the conditioned water return line pH monitor 72, the specific ion electrode 74, the conductivity monitor 75, and the lower outlet electronic valve 52, for electronically and programmatically initiating and terminating conditioner and buffer injection, measuring pH, measuring total system evaporative cooling water hardness, measuring total system evaporative cooling water conductivity, and opening and closing the lower outlet electronic valve 52.

Exemplary embodiments of my apparatus and process for conditioning water in an evaporative cooling system are illustrated by the examples listed below.

EXAMPLE 1

An exemplary embodiment of the apparatus and processes of the present invention is illustrated by a first example with respect to the evaporative cooling system 10 shown schematically in conjunction with an exemplary embodiment of my invention 40 in FIG. 2.

Confidential and experimental tests of this exemplary embodiment were conducted over a period of weeks on an evaporative cooling system 10 servicing a multi-story office building. Prior to the installation of my invention, the hardness of the evaporative cooling system water at a time shortly before blowdown through the drain 24 was typically about 850 ppm. Following blowdown and the addition of makeup water, the hardness was typically 765 ppm. The highest concentration ratio achieved by the owners in prior treatments was approximately 5.5, and the cooling system's blowdown volume was approximately 20 percent of the evaporation in gallons per day.

In this first example, my process was enabled using the configuration of equipment shown in FIG. 2. (The optional controller 80 was not present at the outset of these tests, but has been successfully adapted to the remaining equipment since.) Liquid potassium hydroxide was chosen for the conditioner, using commercially available product that was 45 percent active potassium hydroxide and 55 percent water. Liquid glycolic acid was chosen for the buffer, using commercially available product that was 70 percent active and 30 percent water. Although the experiment was started with an open top tank, a closed tank was chosen after a period of time, in anticipation of future evaporative cooling system requirements at other locations.

At the beginning of the process in this example, the evaporative cooling water had high turbidity due in large part to the presence of solids. The process was initiated by first injecting a buffer, glycolic acid, in amounts calculated to approximate at least 200 ppm concentration of glycolic acid based on the total system evaporative cooling water volume, and then rapidly injecting a conditioner, potassium hydroxide in a volume to approximate at least 400 ppm based on the total system evaporative cooling water volume.

The conditioner injection raised the pH of the evaporative cooling water entering the reaction chamber tank 44 to approximately 9.2-10.2, resulting, as expected, in suspended calcium carbonate solids precipitating from the evaporative cooling water into the tank. These solids, being heavier than water, tended to gravitate toward the bottom of the tank. The presence of the buffer, however, is believed to have caused the formation of calcium acetate or calcium chelate, causing the precipitating solids to remain in a fluid consistency As the evaporative cooling water continued to circulate, the evaporative cooling water in the tank continued to mix with the incoming evaporative cooling water, such that the evaporative cooling water in the tank, particularly in the lower portion, accumulated both the precipitating suspended solids, the conditioner, and the calcium acetate and/or calcium chelate, such that the evaporative cooling water in the tank continuously acquired an even higher pH. As the evaporative cooling water continued to circulate, a "fluid bed" 82 developed in the bottom of the tank having a pH of approximately 12-14. At this stage, the fluid bed 82 included the increased concentration of conditioner, buffer, calcium acetate and/or calcium chelate, and a growing amount of precipitated suspended solids, all in a sludge consistency, capable of flowing in typical piping. It was clear that the presence of the buffer in the fluid bed prevented the solidification of the precipitated solids, causing the fluid bed to remain fluid. It is believed that this is due to the size reduction of the calcium carbonate solids, as at least some of the hardness ions reacted with the buffer to form calcium acetate or calcium chelate. This fluid bed became heavier and heavier relative to the evaporative cooling water, the fluid bed developing as a soft sludge, and became well established in the lower portion of the tank 44. As this was developing the evaporative cooling water exiting the tank through the upper outlet was observed to become less and less turbid, and finally clear. This indicated a substantial reduction in dissolved solids and hardness. This also indicated a satisfactory fluid bed accumulation, in that the evaporative cooling water entering the tank was mixing well with the fluid bed as the entering water was forced into the fluid bed, the mixing action causing an accelerated reduction of hardness, as the evaporative cooling water exited the tank through the upper outlet 48.

At this point in the example, where the evaporative cooling water exiting the upper outlet 48 became substantially clear, the conditioner injection was slowed down in incremental stages until the process had reached an acceptable status, i.e. a hardness concentration for the total evaporative cooling system of less than approximately 450 ppm, while precipitated, suspended solids continued to be added to the fluid bed 82 in the lower portion of the tank 44.

It then became desirable to regulate the height of the fluid bed 82. For this purpose, the lower outlet 50 was originally positioned at a height on the tank 44 that was anticipated to be a minimum height for the fluid bed within the tank. During this experiment, samples were taken from the lower outlet by manually operating the valve 52 from time to time to determine if the fluid bed (easily recognizable because of its increasingly high concentration of suspended solids) had grown to the height of the lower outlet in the tank.

At a point following the observation of clear water at the upper outlet, and the incremental reduction in the amount of conditioner injection, a sample at the lower outlet indicated that the fluid bed had exceeded the level of the lower outlet. The tank was then "blown down" until the fluid bed above the level of the lower outlet was discharged through the lower outlet and into a sewer. In an ongoing operation, then, this is the total blowdown for the entire evaporative cooling system, and the discharged evaporative cooling water was noted to be approximately 200,000 ppm, as total hardness.

Through various adjustments, supply and conditioned water return line sizings, and pump sizings, it was determined that an acceptable range of pH for the evaporative cooling water entering the tank is 8.8-11.5. Optimally, the range of pH for the evaporative cooling water entering the tank is 9.2-9.4. This pH is measured at the supply line pH monitor 70.

Although significant and desirable reactions have occurred within the reaction chamber 42, it was not desirable to permit evaporative cooling water with an increased pH to return to the evaporative cooling tower basin 13, since increased pH would encourage solids to precipitate while evaporative cooling water was being warmed at the heat exchanger 16. The injection of the buffer to the evaporative cooling water exiting the tank 44 reduces the pH, forming calcium acetate or calcium chelate with the remaining hardness ions in the evaporative cooling water, essentially neutralizing this otherwise undesirable effect of raising the pH with the conditioner at the tank entry.

The addition of the buffer, an organic acid, further reduces the likelihood of solids precipitation at the heat exchanger, because the solids are more soluble in the organic acid when the temperature rises. Although this will, to some extent, raise the amount of solids precipitating in the cooling tower basin 13, where the temperature falls, it remains that it is more desirable to have such precipitation in the cooling tower basin than the heat exchanger, because fluid bed in the basin is much easier to clean and will not negatively effect the performance of the heat exchanger 16.

As a result of the experimentation conducted in this example, it was determined that an acceptable pH reduction target, achieved through regulating the amount of buffer injected, is 0.1-0.4, optimally 0.2-0.4, as measured at the conditioned water return line pH monitor 72. Such experimentation also allowed a determination that a satisfactory reaction time in the reaction chamber tank 44, for a given portion of the evaporative cooling water, is 1-60 seconds, optimally approximately 3 seconds. Similarly, it was also estimated that from 0.2-3.5 pounds of buffer is required for each pound of hardness entering the evaporative cooling system in the makeup water.

The experimentation in this example indicated that the fluid bed 82 has a soft sludge consistency that allows it to flow through standard piping, such as the tank lower outlet 50 and electronic valve 52. This sludge, in the tank, typically contains from 0.25-4 pounds of hardness per gallon. The sludge exiting the tank through the tank lower outlet will typically contain from 0.5-2 pounds of hardness per gallon.

Such experimentation also led to the observation that, when the fluid bed 82 has been established and the total evaporative cooling water hardness was stabilized at an acceptable level, the total evaporative cooling water hardness was below 1450 ppm, and the buffer concentration ranged from 75-24,000 ppm with a more frequent concentration range of 200-20,000 ppm, calculated based on the volume of buffer added and the evaporative cooling system volume. Similarly, the conditioner concentration was observed to range from 200-40,000 ppm with a more frequent concentration range of 400-40,000 ppm.

Figure 6:
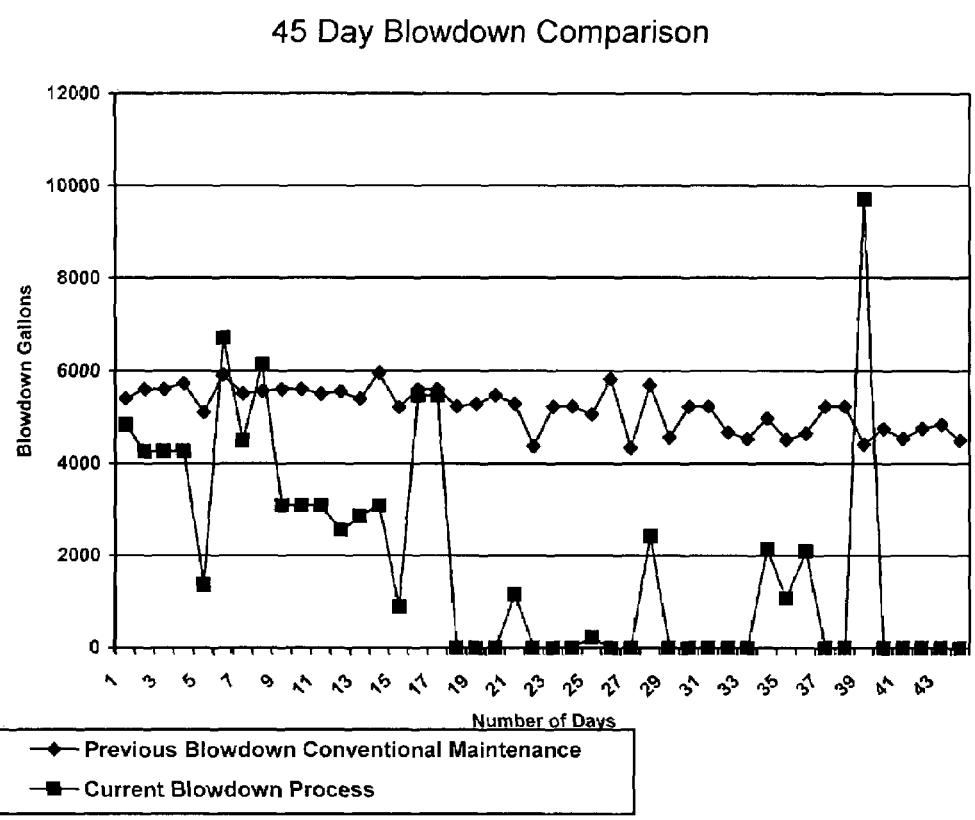
FIG. 6 is a chart comparing blow down volumes.

The chart shown in FIG. 6 compares actual blowdown water volumes (in gallons) from the reaction chamber 42, over a 45 day period beginning with the initiation of the buffer and conditioner injection, compared to actual blowdown volumes over the immediately preceding 45 day period. As experimental modifications were made, it is observable from the chart that the process was optimized on about day 18. At this time during the experiment, the reaction chamber upper outlet was blown down every several days, thus a zero blowdown is shown for days without blowdown and the periodic blowdown spikes are averagable over the days between blowdowns. Following day 18, and excluding a system inspection shutdown on day 39, the process blowdown averaged about 4 gallons per day, compared to an average of 4,000-5000 gallons per day of blowdown in the conventional evaporative cooling system. This reduction is made possible by the extremely high concentration of precipitated, suspended solids in the drained fluid bed 82, the concentration being approximately 200,000 ppm.

Prospectively, sodium hydroxide may be substituted for potassium hydroxide, and will perform the desired function, although it is anticipated that it will not work as well, and the commercially available liquid sodium hydroxide will likely have handling problems due to a lack of consistency in the containers due to evaporation.

Prospectively, calcium hydroxide may be substituted for potassium hydroxide, and will perform the desired function, although it is anticipated that it will not work as well, and is subject to the same consistency problems as sodium hydroxide.

Prospectively, acetic acid may be substituted for glycolic acid, and will perform the desired function, although it is anticipated that it will require a larger volume of acetic acid to perform at the level of the glycolic acid.

EXAMPLE 2

An exemplary embodiment of the apparatus and processes of the present invention is illustrated by a second example with respect to the evaporative cooling system 10 shown schematically in FIG. 2. In this example, the controller 80 is installed and connected as described above. The controller is microprocessor based and is configured to receive the pH value measured by the supply line pH monitor for the evaporative cooling water entering the tank, and to cause the conditioner injection pump 64 to inject conditioner from the conditioner supply 62 when the pH is shown by the pH measurement to be less than the 9.2-9.4 optimum range, or about to fall from such range. Subsequent measurements communicated to the controller, indicating the pH has returned to the pre-determined desired level, cause the controller to signal the conditioner injection pump to cease injection.

Similarly, the controller 80 in this exemplary embodiment is configured to receive the pH value measured by the conditioned water return line pH monitor for the evaporative cooling water exiting the tank, and to cause the buffer injection pump 68 to inject buffer from the buffer supply 66 when the pH is not less than the pH measurement for the evaporative cooling water entering the tank 44 (as measured at the supply line pH monitor 70), by at least 0.2, or a difference approaching 0.2. Since the desired reduction from the entering evaporative cooling water pH is 0.2-0.4, then the controller will cause the buffer injection pump 68 to inject into the exiting evaporative cooling water at a point upstream of the buffer pH monitor 72. The additional buffer will lower the pH of the exiting evaporative cooling water, and subsequent pH measurements communicated to the controller will indicate at least a 0.2 pH reduction is shown by the pH measurement to be less than the 9.2-9.4 optimum range, or about to fall from such range. Subsequent measurements communicated to the controller, indicating the exiting evaporative cooling water pH has returned to the pre-determined desired level, causes the controller to signal the buffer injection pump to cease injection.

Further, in the exemplary embodiment represented by this second example, the controller 80 receives periodic measurements of the evaporative cooling water total hardness from the specific ion electrode 74, and stores the information for evaluation. If the total hardness measurement is above or below desired parameters, the controller indicates an alarm condition by turning on a light.

Additionally, in this second example exemplary embodiment, the controller 80 receives periodic measurements of the evaporative cooling water total conductivity from the conductivity monitor 75, and stores the information for evaluation. If the total hardness measurement is above or below desired parameters, the controller indicates an alarm condition by turning on a light.

In this second example, the controller 80 electronically controls the reaction chamber lower outlet electronic valve 52. Experimentation in the field has shown that for the building's evaporative cooling system, a scheduled daily blowdown at the valve for approximately 3 minutes is sufficient to maintain the fluid bed 82 level at the level needed to maintain the total system hardness at an acceptable level. However, depending on water quality and the rating of the evaporative cooling system, the time can be readily increased or decreased as needed, to properly regulate the total hardness for the evaporative cooling system.

EXAMPLE 3

An exemplary embodiment of the apparatus and processes of the present invention is illustrated by a third example with respect to the evaporative cooling system 10 shown schematically in FIG. 2. In this example, the glycolic acid was replaced by a 10 percent citric acid solution. The substitution worked in the process although it was noted that significantly increased volumes of citric acid and increased chemical handling were required, when compared to glycolic acid.

EXAMPLE 4

An exemplary embodiment of the apparatus and processes of the present invention is illustrated by a fourth example in which 30 percent active ascorbic acid was substituted for glycolic acid in a laboratory test designed to evaluate the effectiveness of the ascorbic acid as a buffer. In this test, 250 milliliters of 400 ppm hardness water was placed in each of two 400 milliliter beakers. Potassium hydroxide, 400 ppm, (45 percent solids) was added to each beaker, creating turbid, 180 ppm suspended solids solutions. Glycolic acid, 70 percent active, was added to the first beaker until the solution became clear. To make the solution clear, 220 microliters of the 70 percent active glycolic acid was required. A 30 percent active solution of ascorbic acid (vitamin C) was added to the second beaker until the solution became clear. Ascorbic acid, 860 microliters, (258 ppm active ascorbic acid) was required to make the solution clear. These results indicated that the amount, by active weight, of the ascorbic acid required exceeded the amount of glycolic acid required to achieve the same results, by a factor of approximately 1.67

Although the foregoing substitution was shown by the laboratory test to work in the process, it is evident that significantly increased volumes of ascorbic acid were required, when compared to glycolic acid.

EXAMPLE 5

An exemplary embodiment of the apparatus and processes of the present invention is illustrated by a fifth example with respect to the evaporative cooling system 10 shown schematically in FIG. 2. In this example, the potassium hydroxide conditioner was replaced by a pre-mixed solution of potassium hydroxide and an amine. The solution was 5 percent by volume amine, which acted as an accelerator, making the solids collected in the tank 544 more fluid. Blowdown solids collected during the tests covered a large area on a flat surface, and had less depth than the solution collected without the amine.

In this regard, the amine may be chosen from those such as 2 amino-2-methyl-1-propanol, 2 amino-2-ethyl-1,3-propanediol, or 2-dimethylamino-2-methyl-1-propanol. In this example, 2 amino-2-methyl-1-propanol was used. For a given level of performance the addition of the amine reduced the amount of potassium hydroxide required. When 1 percent 2 amino-2-methyl-1-propanol was used the liquid potassium hydroxide/water solution required was reduced by 1-5 percent. When 5 percent 2 amino-2-methyl-1-propanol was used the liquid potassium hydroxide/water solution required was reduced by 5-15 percent. It was observed that upon the addition of the amine the hardness of water, as measured at the specific ion electrode 74, was reduced. The amount of conditioner being added was then reduced until the level of hardness returned to the pre-amine addition level. This reduction represents the amount of conditioner reduction made possible by the addition of the amine.

In the exemplary embodiments described above, the injection pumps 64, 68 are known electronic metering pumps that can be readily adjusted to provide injection rate ranges to accommodate the requirements of my process. Likewise, the controller 80 is a commercially available microprocessor based device that is readily configurable to control electronic valves such as the tank lower outlet electronic valve 52, and to receive pH measured values, and other information, as described above. The supply line 58 in the above examples is constructed from conventional PVC piping, with a one inch nominal ID, while the conditioned water return line 60 is constructed from PVC piping, with a one inch nominal ID. The tank 44, constructed from polyethylene is an open top tank.

Similarly, the pH monitors 70, 72 are conventional inline pH probes that are commercially available. The buffer supply 66 and the conditioner supply 62 are conventional polyethylene containers that are readily configurable to accommodate the injection pumps 64, 68. The specific ion electrode 74 for measuring total evaporative cooling water hardness is conventional and commercially available, as is the conductivity monitor 75.

Figure 3:
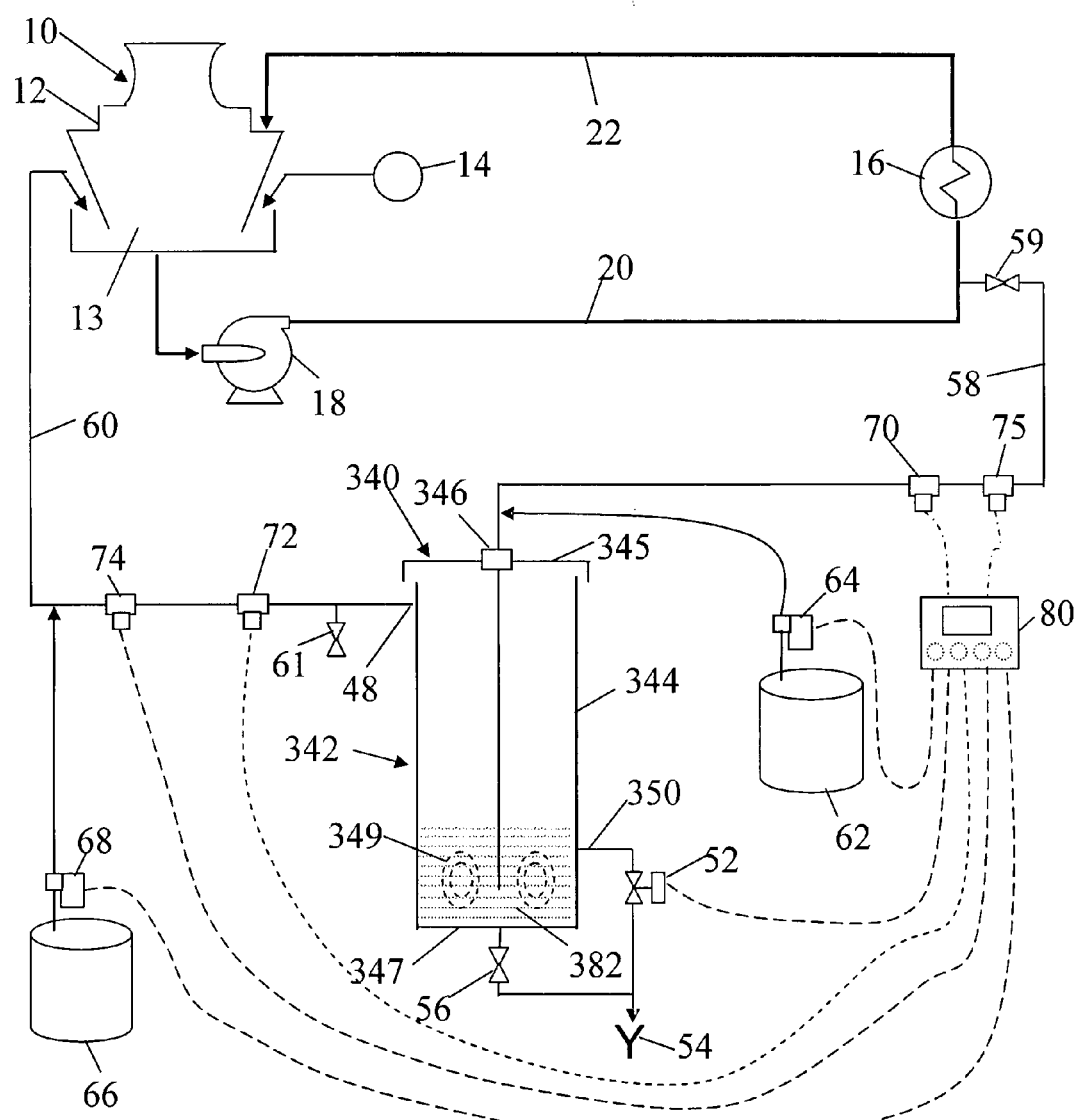
FIG. 3 is a schematic representation of an exemplary embodiment of my apparatus and process adapted to the conventional evaporative cooling system of FIG. 1.

Another exemplary embodiment of the conditioning process 340 of the present invention is schematically depicted in FIG. 3. In this exemplary embodiment, the process equipment includes a reaction chamber 342 with a tank 344 having an inlet 346, an upper outlet 48, a lower outlet 350 having an electronically operated valve 52, and a drain 54 with a valve 56. A sidestream circulation is established by a supply line 58 extending from the cooling system cool water supply line 20 to the tank inlet 346, and a conditioned water return line 360 extending from the tank upper outlet 48 and finally discharging into the cooling tower basin 13. The sidestream circulation in this exemplary embodiment is approximately 0.1-0.5 percent of the total evaporative cooling water recirculation rate. A valve 59 is provided for isolating the supply line from the cooling system cool water supply line. A supply of conditioner 62 is injectable into the supply line 58 using a conventional injection pump 64. Similarly, a supply of buffer 66 is injectable into the conditioned water return line 60 using injection pump 68.

In the exemplary embodiments depicted by FIG. 2, the tank inlet 46 entered from the side, extended to approximately the middle of the tank 44 and was then directed downward by an ell. The tank 44 in such an embodiment was an atmospheric pressured tank. In the exemplary embodiments depicted by FIG. 3, the tank inlet 346 enters the tank 344 at the top 345 of the tank, and the tank 344 is not a pressured tank. The tank inlet 346 extends downwardly to approximately 12 inches from the tank bottom 347.

In the exemplary embodiment of FIG. 3, conventional pH monitoring equipment is provided with a supply line pH monitor 70 positioned on the supply line 58, and a conditioned water return line pH monitor 72 positioned on the conditioned water return line 60 upstream from the point of buffer injection. Positioned on the conditioned water return line is a specific ion electrode (total hardness) 74 for measuring hardness of the evaporative cooling water in parts per million, and a small valve 61 (between the tank and the conditioned water return line pH monitor 72), the small valve being used to draw samples of evaporative cooling water and observing the drawn waters clarity. A conductivity monitor 75 is positioned on the supply line 58.

In this exemplary embodiment, a controller 80 is operationally connected to the conditioner injection pump 64, the buffer injection pump 68, the supply line pH monitor 70, the conditioned water return line pH monitor 72, the specific ion electrode 74, the conductivity monitor 75, and the lower outlet electronic valve 52, for electronically and programmatically initiating and terminating conditioner and buffer injection, measuring pH, measuring total system evaporative cooling water hardness, measuring total system evaporative cooling water conductivity, and opening and closing the lower outlet electronic valve 52.

Exemplary embodiments of my apparatus and process for conditioning water in an evaporative cooling system are illustrated by the examples listed below, with respect to FIG. 3.

EXAMPLE 6

An exemplary embodiment of the apparatus and processes of the present invention is illustrated by a sixth example with respect to the evaporative cooling system 10 shown schematically in conjunction with such exemplary embodiment of my invention 340 in FIG. 3.

Confidential and experimental tests of this exemplary embodiment were conducted on an evaporative cooling system 10 servicing a large public facility. Prior to the installation of my invention, the hardness of the evaporative cooling system water at a time shortly before blowdown through the drain 54 was typically about 850 ppm. Following blowdown and the addition of makeup water, the hardness was typically from 700-765 ppm. The highest concentration ratio achieved by the owners in prior treatments was approximately 3.0, and the cooling system's blowdown volume was approximately 50 percent of the evaporation in gallons per day.

In this sixth example, my process was enabled using the configuration of equipment shown in FIG. 3. (At the beginning an ell was positioned at the end of the tank inlet 346, but was removed after approximately one month.) Liquid potassium hydroxide was chosen for the conditioner, using commercially available product that was 45 percent active potassium hydroxide and 55 percent water. Liquid glycolic acid was chosen for the buffer, using commercially available product that was 70 percent active and 30 percent water.

At the beginning of the process in this example, the evaporative cooling water had high turbidity due in large part to the presence of solids. The process was initiated by first injecting a buffer, glycolic acid, in amounts calculated to approximate at least 200 ppm concentration of glycolic acid based on the total system evaporative cooling water volume, and then rapidly injecting a conditioner, potassium hydroxide in a volume to approximate at least 400 ppm based on the total system evaporative cooling water volume.

The conditioner injection raised the pH of the evaporative cooling water entering the reaction chamber tank 344 to approximately 8.5-14, resulting, as expected, in suspended calcium carbonate solids precipitating from the evaporative cooling water into the tank. These solids, being heavier than water, tended to gravitate toward the bottom of the tank. The presence of the buffer, however, is believed to have caused the formation of calcium acetate or calcium chelate, causing the precipitating solids to remain in a fluid consistency.

As depicted in FIG. 3, the evaporative cooling water exiting the tank inlet 346 established a substantially circular circulation pattern 349, providing sufficient agitation for the mixing required within the tank 344.

As the evaporative cooling water continued to circulate, the evaporative cooling water in the tank continued to mix with the incoming evaporative cooling water, such that the evaporative cooling water in the tank, particularly in the lower portion, accumulated both the precipitating suspended solids, the conditioner, and the calcium acetate and/or calcium chelate, such that the evaporative cooling water in the tank continuously acquired an even higher pH. As the evaporative cooling water continued to circulate, a "fluid bed" 382 developed in the bottom of the tank having a pH of approximately 9.5-14.

At this stage, the fluid bed 382 included the increased concentration of conditioner, buffer, calcium acetate and/or calcium chelate, and a growing amount of precipitated suspended solids, all in a sludge consistency, capable of flowing in typical piping. It was clear that the presence of the buffer in the fluid bed prevented the solidification of the precipitated solids, causing the fluid bed to remain fluid. It is believed that this is due to the size reduction of the calcium carbonate solids, as at least some of the hardness ions reacted with the buffer to form calcium acetate or calcium chelate. This fluid bed became heavier and heavier relative to the evaporative cooling water, the fluid bed developing as a soft sludge, and became well established in the lower portion of the tank 344. As this was developing the evaporative cooling water exiting the tank through the upper outlet was observed to become less and less turbid, and finally clear. This indicated a substantial reduction in dissolved solids and hardness. This also indicated a satisfactory fluid bed accumulation, in that the evaporative cooling water entering the tank was mixing well with the fluid bed as the entering water was forced into the fluid bed, the mixing action causing an accelerated reduction of hardness, as the evaporative cooling water exited the tank through the upper outlet 48.

At this point in the sixth example, where the evaporative cooling water exiting the upper outlet 48 became substantially clear, the conditioner injection was slowed down in incremental stages until the process had reached an acceptable status, i.e. a hardness concentration for the total evaporative cooling system of less than approximately 450 ppm, while precipitated, suspended solids continued to be added to the fluid bed 382 in the lower portion of the tank 344.

It is desirable to regulate the height of the fluid bed 382. For this purpose, the lower outlet 350 was positioned at a height on the tank 344 that was anticipated to be a minimum height for the fluid bed within the tank. During this experiment, samples were taken from the lower outlet 350 by manually operating the valve 52 from time to time to determine if the fluid bed (easily recognizable because of its increasingly high concentration of suspended solids) had grown to the height of the lower outlet in the tank. At a point following the observation of clear water at the upper outlet 48, and the incremental reduction in the amount of conditioner injection, a sample at the lower outlet indicated that the fluid bed had exceeded the level of the lower outlet. The tank was then "blown down" until the fluid bed above the level of the lower outlet was discharged through the lower outlet and into a sewer. As previously discussed for the exemplary embodiment for FIG. 2, for an ongoing operation, this is the total blowdown for the entire evaporative cooling system, and the discharged evaporative cooling water was noted to be approximately 200,000-450,000 ppm, as total hardness.

It was determined, for the exemplary embodiment depicted in FIG. 3, that an acceptable range of pH for the evaporative cooling water entering the tank is 8.8-11.5. This pH is measured at the supply line pH monitor 70.

As was the case for the exemplary embodiment depicted in FIG. 2, significant and desirable reactions occurred within the reaction chamber 342, but it is not desirable to permit evaporative cooling water with an increased pH to return to the evaporative cooling tower basin 13, since increased pH would encourage solids to precipitate while evaporative cooling water was being warmed at the heat exchanger 16. For the exemplary embodiment of FIG. 3, the injection of the buffer to the evaporative cooling water exiting the tank 344 reduces the pH, forming calcium acetate or calcium chelate with the remaining hardness ions in the evaporative cooling water, essentially neutralizing this otherwise undesirable effect of raising the pH with the conditioner at the tank entry.

As was the previously described case with respect to the exemplary embodiments of FIG. 2, the addition of the buffer, an organic acid, further reduces the likelihood of solids precipitation at the heat exchanger, because the solids are more soluble in the organic acid when the temperature rises. Although this will, to some extent, raise the amount of solids precipitating in the cooling tower basin 13, where the temperature falls, it remains that it is more desirable to have such precipitation in the cooling tower basin than the heat exchanger, because fluid bed in the basin is much easier to clean and will not negatively effect the performance of the heat exchanger 16. Notably, the evaporative cooling system 10 at which the exemplary embodiment depicted in FIG. 3 was installed, had significant scale build up in the heat exchanger 16 tubes. Following the installation of this exemplary embodiment, such tube scale was determined to have been cleaned from the exchanger tubes as a result of the process.

As a result of the experimentation conducted in this example, it was determined, for the exemplary embodiment depicted in FIG. 3, that an acceptable pH reduction target, achieved through regulating the amount of buffer injected, is 0.1-0.4, optimally 0.2-0.4, as measured at the conditioned water return line pH monitor 72. Such experimentation also allowed a determination that a satisfactory reaction time in the reaction chamber tank 344, for a given portion of the evaporative cooling water, is 1-60 seconds, optimally approximately 10 seconds. Similarly, it was also estimated that from 0.2-3.5 pounds of buffer is required for each pound of hardness entering the evaporative cooling system in the makeup water.

The experimentation in this exemplary embodiment depicted in FIG. 3 indicated that the fluid bed 382 has a soft sludge consistency that allows it to flow through standard piping, such as the tank lower outlet 350 and electronic valve 52. This sludge, in the tank, typically contains from 0.25-4 pounds of hardness per gallon. The sludge exiting the tank through the tank lower outlet will typically contain from 0.5-1 pounds of hardness per gallon.

Such experimentation also led to the observation that when the fluid bed 382 has been established and the total evaporative cooling water hardness was stabilized at an acceptable level, the total evaporative cooling water hardness was below 800 ppm, and the buffer concentration ranged from 75-24,000 ppm with a more frequent concentration range of 200-20,000 ppm, calculated based on the volume of buffer added and the evaporative cooling system volume. Similarly, the conditioner concentration was observed to range from 200-40,000 ppm with a more frequent concentration range of 400-4,000 ppm.

The following table compares actual blowdown water volumes (in gallons) from the reaction chamber 342, for the month of August, 2004 compared to actual blowdown volumes for the month of August, 2003. As can be seen from the table, the process blowdown averaged about approximately 1.05 gallons per day, compared to an average of approximately 20,284 gallons per day of blowdown in the conventional evaporative cooling system. This reduction is made possible by the extremely high concentration of precipitated, suspended solids in the drained fluid bed 382, the concentration being approximately 200,000-400,000 ppm.

| HYCYCLER BLOWDOWN DATA Blowdown Volume in Gallons | | |
|---|---|---|
| Day | August, 2003 | August, 2004 |
| 1 | 18,900 | 0 |
| 2 | 9,700 | 2 |
| 3 | 8,200 | 2 |
| 4 | 19,900 | 1 |
| 5 | 19,100 | 1 |
| 6 | 18,800 | 2 |
| 7 | 20,200 | 0 |
| 8 | 22,300 | 0 |
| 9 | 10,500 | 2 |
| 10 | 8,900 | 1.5 |
| 11 | 24,000 | 1 |
| 12 | 23,700 | 1 |
| 13 | 24,600 | 1 |
| 14 | 25,400 | 0 |
| 15 | 24,900 | 0 |
| 16 | 17,700 | 2 |
| 17 | 16,200 | 2 |
| 18 | 23,800 | 1 |
| 19 | 22,900 | 1 |
| 20 | 25,100 | 1 |
| 21 | 28,300 | 0 |
| 22 | 20,300 | 0 |
| 23 | 17,900 | 2 |
| 24 | 18,400 | 1.5 |
| 25 | 27,800 | 1 |
| 26 | 26,100 | 1 |
| 27 | 26,900 | 2 |
| 28 | 25,400 | 0 |
| 29 | 26,300 | 0 |
| 30 | 9,900 | 1.5 |
| 31 | 8,700 | 2 |

The prospective substitutions discussed with respect to the exemplary embodiment of FIG. 2 are also prospectively applicable to the exemplary embodiment depicted in FIG. 3 with analogous effects. These substitutions include sodium hydroxide for potassium hydroxide, calcium hydroxide for potassium hydroxide, and acetic acid for glycolic acid.

Similarly, the functions and operation of the controller 80 are analogous in the exemplary embodiments of FIG. 2 and FIG. 3.

Figure 4:
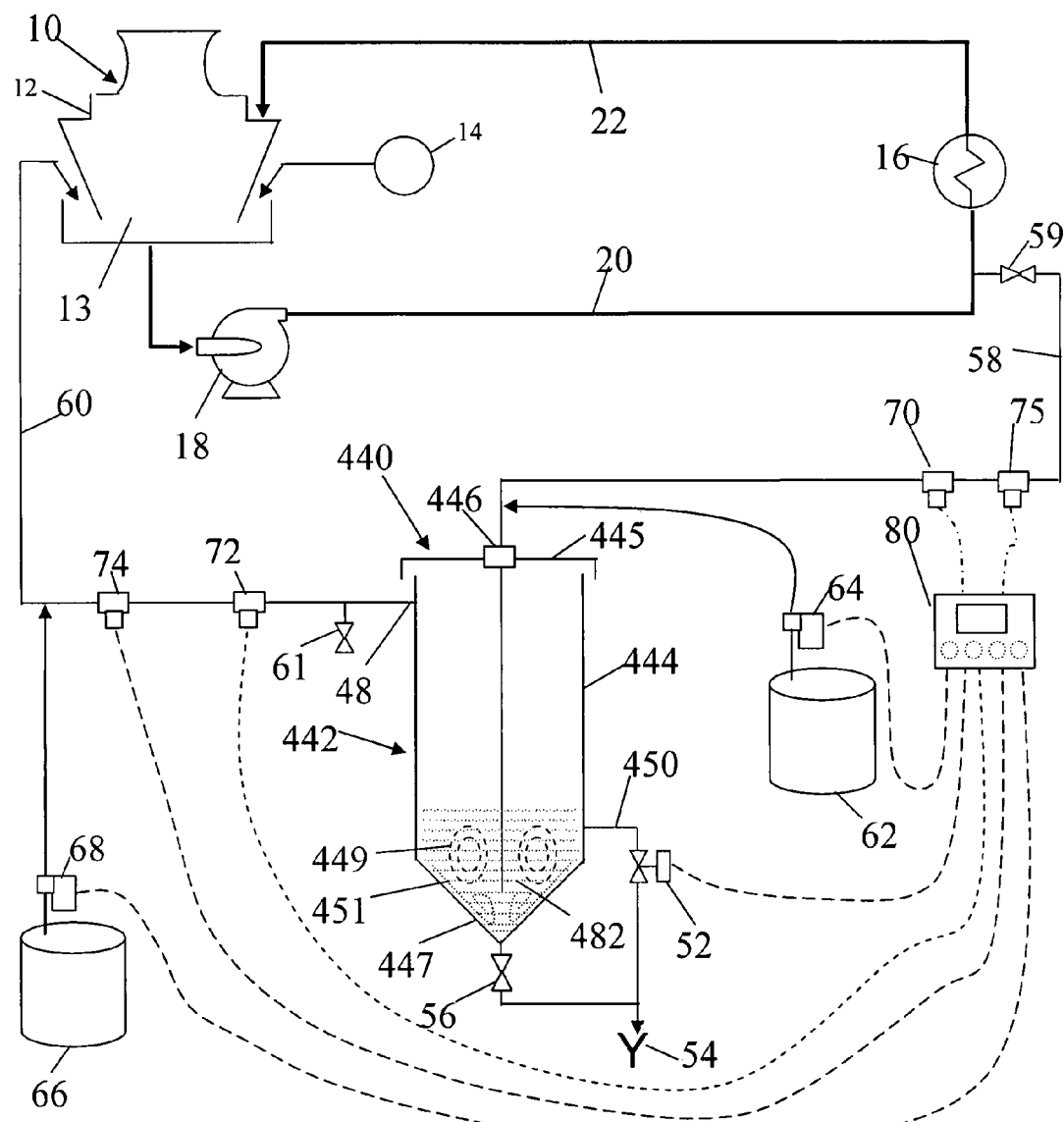
FIG. 4 is a schematic representation of an exemplary embodiment of my apparatus and process adapted to the conventional evaporative cooling system of FIG. 1.

Another exemplary embodiment of the conditioning process 440 of the present invention is schematically depicted in FIG. 4. In this exemplary embodiment, the process equipment includes a reaction chamber 442 with a tank 444 having an inlet 446, an upper outlet 48, a lower outlet 450 having an electronically operated valve 52, and a drain 54 with a valve 56. A sidestream circulation is established by a supply line 58 extending from the cooling system cool water supply line 20 to the tank inlet 446, and a conditioned water return line 60 extending from the tank upper outlet 48 and finally discharging into the cooling tower basin 13. The sidestream circulation in this exemplary embodiment is approximately 0.1-0.5 percent of the total evaporative cooling water recirculation rate. A valve 59 is provided for isolating the supply line from the cooling system cool water supply line. A supply of conditioner 62 is injectable into the supply line 58 using a conventional injection pump 64. Similarly, a supply of buffer 66 is injectable into the conditioned water return line 60 using injection pump 68.

In the exemplary embodiment depicted by FIG. 4, the tank inlet 446 enters the tank 444 at the top 445 of the tank, and the tank 444 is not a pressured tank. The tank inlet 446 extends downwardly to approximately 12 inches from the tank bottom 447, which is cone shaped.

In the exemplary embodiment of FIG. 4, conventional pH monitoring equipment is provided with a supply line pH monitor 70 positioned on the supply line 58, and a conditioned water return line pH monitor 72 positioned on the conditioned water return line 60 upstream from the point of buffer injection. Positioned on the conditioned water return line is a specific ion electrode (total hardness) 74 for measuring hardness of the evaporative cooling water in parts per million, and a small valve 61 (between the tank and the conditioned water return line pH monitor 72), the small valve being used to draw samples of evaporative cooling water and observing the drawn waters clarity. A conductivity monitor 75 is positioned on the supply line 58.

In this exemplary embodiment, a controller 80 is operationally connected to the conditioner injection pump 64, the buffer injection pump 68, the supply line pH monitor 70, the conditioned water return line pH monitor 72, the specific ion electrode 74, the conductivity monitor 75, and the lower outlet electronic valve 52, for electronically and programmatically initiating and terminating conditioner and buffer injection, measuring pH, measuring total system evaporative cooling water hardness, measuring total system evaporative cooling water conductivity, and opening and closing the lower outlet electronic valve 52.

Exemplary embodiments of my apparatus and process for conditioning water in an evaporative cooling system are illustrated by the examples listed below, with respect to FIG. 4.

EXAMPLE 7

An exemplary embodiment of the apparatus and processes of the present invention is illustrated by a seventh example with respect to the evaporative cooling system 10 shown schematically in conjunction with such exemplary embodiment of my invention 440 in FIG. 4.

Confidential and experimental tests of this exemplary embodiment were conducted on an evaporative cooling system 10 servicing a large public facility. Prior to the installation of my invention, the hardness of the evaporative cooling system water at a time shortly before blowdown through the drain 54 was typically about 850 ppm. Following blowdown and the addition of makeup water, the hardness was typically 700-765 ppm. In this seventh example, my process was enabled using the configuration of equipment shown in FIG. 4. Liquid potassium hydroxide was chosen for the conditioner, using commercially available product that was 45 percent active potassium hydroxide and 55 percent water. Liquid glycolic acid was chosen for the buffer, using commercially available product that was 70 percent active and 30 percent water.

At the beginning of the process in this example, the evaporative cooling water had high turbidity due in large part to the presence of solids. The process was initiated by first injecting a buffer, glycolic acid, in amounts calculated to approximate at least 200 ppm concentration of glycolic acid based on the total system evaporative cooling water volume, and then rapidly injecting a conditioner, potassium hydroxide in a volume to approximate at least 400 ppm based on the total system evaporative cooling water volume.

The conditioner injection raised the pH of the evaporative cooling water entering the reaction chamber tank 444 to approximately 8.5-14, resulting, as expected, in suspended calcium carbonate solids precipitating from the evaporative cooling water into the tank. These solids, being heavier than water, tended to gravitate toward the bottom of the tank. The presence of the buffer, however, is believed to have caused the formation of calcium acetate or calcium chelate, causing the precipitating solids to remain in a fluid consistency.

As depicted in FIG. 4, the evaporative cooling water exiting the tank inlet 446 established a substantially circular circulation pattern 449, providing sufficient agitation for the mixing required within the tank 444.

As the evaporative cooling water continued to circulate, the evaporative cooling water in the tank continued to mix with the incoming evaporative cooling water, such that the evaporative cooling water in the tank, particularly in the lower portion, accumulated both the precipitating suspended solids, the conditioner, and the calcium acetate and/or calcium chelate, such that the evaporative cooling water in the tank continuously acquired an even higher pH. As the evaporative cooling water continued to circulate, a "fluid bed" 482 developed in the bottom of the tank having a pH of approximately 8.5-14, typically 9.5-10.5. Precipitated solids tended to migrate down the sides of the cone-shaped tank bottom 447, gaining in thickness and density toward the bottom of the cone portion, while maintaining a drainable consistency.

At this stage, the fluid bed 482 included the increased concentration of conditioner, buffer, calcium acetate and/or calcium chelate, and a growing amount of precipitated suspended solids, all in a sludge consistency, capable of flowing in typical piping. It was clear that the presence of the buffer in the fluid bed prevented the solidification of the precipitated solids, causing the fluid bed to remain fluid. It is believed that this is due to the size reduction of the calcium carbonate solids, as at least some of the hardness ions reacted with the buffer to form calcium acetate or calcium chelate. This fluid bed became heavier and heavier relative to the evaporative cooling water, the fluid bed developing as a soft sludge, and became well established in the lower portion of the tank 444. As this was developing the evaporative cooling water exiting the tank through the upper outlet was observed to become less and less turbid, and finally clear. This indicated a substantial reduction in dissolved solids and hardness. This also indicated a satisfactory fluid bed accumulation, in that the evaporative cooling water entering the tank was mixing well with the fluid bed as the entering water was forced into the fluid bed, the mixing action causing an accelerated reduction of hardness, as the evaporative cooling water exited the tank through the upper outlet 48.

At this point in the seventh example, where the evaporative cooling water exiting the upper outlet 48 became substantially clear, the conditioner injection was slowed down in incremental stages until the process had reached an acceptable status, i.e. a hardness concentration for the total evaporative cooling system of less than approximately 450 ppm, while precipitated, suspended solids continued to be added to the fluid bed 482 in the lower portion of the tank 444.

It is desirable to regulate the height of the fluid bed 482. For this purpose, the lower outlet 450 was positioned at a height on the tank 444 that was anticipated to be a minimum height for the fluid bed within the tank. During this experiment, samples were taken from the lower outlet 450 by manually operating the valve 52 from time to time to determine if the fluid bed (easily recognizable because of its increasingly high concentration of suspended solids) had grown to the height of the lower outlet in the tank. At a point following the observation of clear water at the upper outlet 48, and the incremental reduction in the amount of conditioner injection, a sample at the lower outlet indicated that the fluid bed had exceeded the level of the lower outlet. The tank was then "blown down" until the fluid bed above the level of the lower outlet was discharged through the lower outlet and into a sewer. As previously discussed for the exemplary embodiment for FIG. 2, for an ongoing operation, this is the total blowdown for the entire evaporative cooling system, and the discharged evaporative cooling water was noted to be approximately 250,000-300,000 ppm, as total hardness.

It was determined, for the exemplary embodiment depicted in FIG. 4, that an acceptable range of pH for the evaporative cooling water entering the tank is 8.8-11.5. This pH is measured at the supply line pH monitor 70.

As was the case for the exemplary embodiment depicted in FIG. 2, significant and desirable reactions occurred within the reaction chamber 442, but it is not desirable to permit evaporative cooling water with an increased pH to return to the evaporative cooling tower basin 13, since increased pH would encourage solids to precipitate while evaporative cooling water was being warmed at the heat exchanger 16. For the exemplary embodiment of FIG. 4, the injection of the buffer to the evaporative cooling water exiting the tank 444 reduces the pH, forming calcium acetate or calcium chelate with the remaining hardness ions in the evaporative cooling water, essentially neutralizing this otherwise undesirable effect of raising the pH with the conditioner at the tank entry.

As was the previously described case with respect to the exemplary embodiments of FIG. 2, the addition of the buffer, an organic acid, further reduces the likelihood of solids precipitation at the heat exchanger, because the solids are more soluble in the organic acid when the temperature rises. Although this will, to some extent, raise the amount of solids precipitating in the cooling tower basin 13, where the temperature falls, it remains that it is more desirable to have such precipitation in the cooling tower basin than the heat exchanger, because scale in the basin is much easier to clean and will not negatively effect the performance of the heat exchanger 16. Notably, the evaporative cooling system 10 at which the exemplary embodiment depicted in FIG. 4 was installed, had significant scale build up in the heat exchanger 16 tubes. Following the installation of this exemplary embodiment, such tube scale was determined to have been cleaned from the exchanger tubes as a result of the process.

As a result of the experimentation conducted in this example, it was determined, for the exemplary embodiment depicted in FIG. 4, that an acceptable pH reduction target, achieved through regulating the amount of buffer injected, is 0.1-0.4, optimally 0.2-0.4, as measured at the conditioned water return line pH monitor 72. Such experimentation also allowed a determination that a satisfactory reaction time in the reaction chamber tank 444, for a given portion of the evaporative cooling water, is 1-60 seconds, optimally approximately 3-5 seconds. Similarly, it was also estimated that from 0.2-3.5 pounds of buffer is required for each pound of hardness entering the evaporative cooling system in the makeup water.

The experimentation in this exemplary embodiment depicted in FIG. 4 indicated that the fluid bed 482 has a soft sludge consistency that allows it to flow through standard piping, such as the tank lower outlet 450 and electronic valve 52. This sludge, in the tank, typically contains from 0.25-3 pounds of hardness per gallon. The sludge exiting the tank through the tank lower outlet will typically contain from 0.5-1 pounds of hardness per gallon.

Such experimentation also led to the observation that, when the fluid bed 482 has been established and the total evaporative cooling water hardness was stabilized at an acceptable level, the total evaporative cooling water hardness was below 750 ppm., and the buffer concentration ranged from 75-24,000 ppm with a more frequent concentration range of 200-20,000 ppm, calculated based on the volume of buffer added and the evaporative cooling system volume. Similarly, the conditioner concentration was observed to range from 200-40,000 ppm with a more frequent concentration range of 400-4,000 ppm.

The prospective substitutions discussed with respect to the exemplary embodiment of FIG. 2 are also prospectively applicable to the exemplary embodiment depicted in FIG. 4 with analogous effects. These substitutions include sodium hydroxide for potassium hydroxide, calcium hydroxide for potassium hydroxide, and acetic acid for glycolic acid.

Similarly, the functions and operation of the controller 80 are analogous in the exemplary embodiments of FIG. 2 and FIG. 4.

Figure 5:
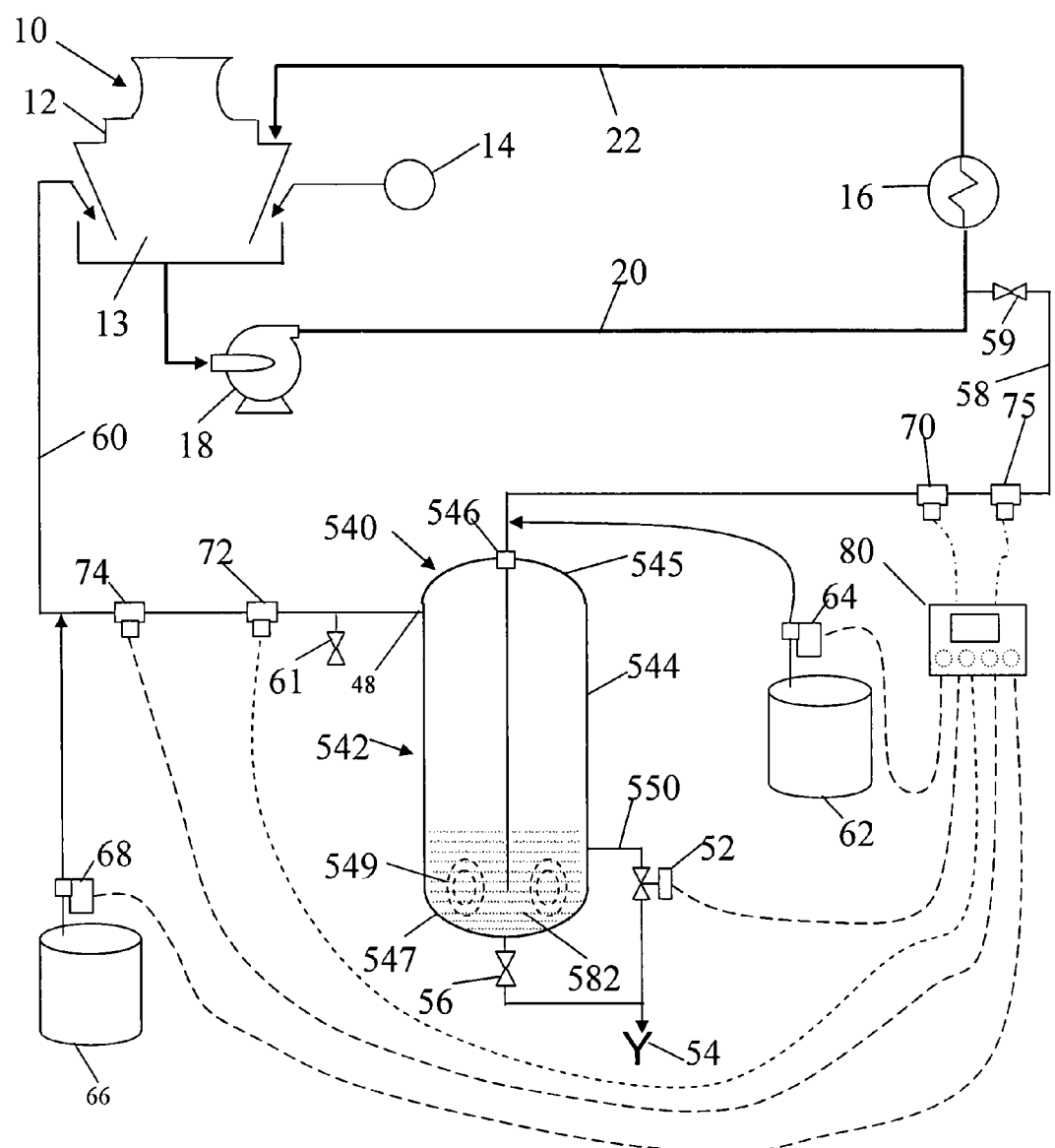
FIG. 5 is a schematic representation of an exemplary embodiment of my apparatus and process adapted to the conventional evaporative cooling system of FIG. 1.

Another exemplary embodiment of the conditioning process 540 of the present invention is schematically depicted in FIG. 5. In this exemplary embodiment, the process equipment includes a reaction chamber 542 with a tank 544 having an inlet 546, an upper outlet 48, a lower outlet 550 having an electronically operated valve 52, and a drain 54 with a valve 56. A sidestream circulation is established by a supply line 58 extending from the cooling system cool water supply line 20 to the tank inlet 546, and a conditioned water return line 60 extending from the tank upper outlet 48 and finally discharging into the cooling tower basin 13. The sidestream circulation in this exemplary embodiment is approximately 0.1-0.5 percent of the total evaporative cooling water recirculation rate. A valve 59 is provided for isolating the supply line from the cooling system cool water supply line. A supply of conditioner 62 is injectable into the supply line 58 using a conventional injection pump 64. Similarly, a supply of buffer 66 is injectable into the conditioned water return line 60 using injection pump 68.

In the exemplary embodiments depicted by FIG. 5, the tank inlet 546 enters the tank 544 at the top 545 of the tank, and the tank 544 is not a pressured tank. The tank inlet 546 extends downwardly to approximately 12 inches from the tank bottom 547, which is cone shaped.

In the exemplary embodiment of FIG. 5, conventional pH monitoring equipment is provided with a supply line pH monitor 70 positioned on the supply line 58, and a conditioned water return line pH monitor 72 positioned on the conditioned water return line 60 upstream from the point of buffer injection. Positioned on the conditioned water return line is a specific ion electrode (total hardness) 74 for measuring hardness of the evaporative cooling water in parts per million, and a small valve 61 (between the tank and the conditioned water return line pH monitor 72), the small valve being used to draw samples of evaporative cooling water and observing the drawn waters clarity. A conductivity monitor 75 is positioned on the supply line 58.

In this exemplary embodiment, a controller 80 is operationally connected to the conditioner injection pump 64, the buffer injection pump 68, the supply line pH monitor 70, the conditioned water return line pH monitor 72, the specific ion electrode 74, the conductivity monitor 75, and the lower outlet electronic valve 52, for electronically and programmatically initiating and terminating conditioner and buffer injection, measuring pH, measuring total system evaporative cooling water hardness, measuring total system evaporative cooling water conductivity, and opening and closing the lower outlet electronic valve 52.

Exemplary embodiments of my apparatus and process for conditioning water in an evaporative cooling system are illustrated by the examples listed below, with respect to FIG. 5.

EXAMPLE 8

An exemplary embodiment of the apparatus and processes of the present invention is illustrated by an eighth example with respect to the evaporative cooling system 10 shown schematically in conjunction with such exemplary embodiment of my invention in FIG. 5.

Confidential and experimental tests of this exemplary embodiment were conducted on an evaporative cooling system 10 servicing a multi-story office building. This exemplary embodiment replaced the reaction chamber 42 in the exemplary embodiment described in Example 2, with a different reaction chamber 542.

In this eighth example, my process was enabled using the configuration of equipment shown in FIG. 5. Liquid potassium hydroxide was chosen for the conditioner, using commercially available product that was 45 percent active potassium hydroxide and 55 percent water. Liquid glycolic acid was chosen for the buffer, using commercially available product that was 70 percent active and 30 percent water.

At the beginning of the process in this example the evaporative cooling water had high turbidity due in large part to the presence of solids. The process was initiated by first injecting a buffer, glycolic acid, in amounts calculated to approximate at least 200 ppm concentration of glycolic acid based on the total system evaporative cooling water volume, and then rapidly injecting a conditioner, potassium hydroxide in a volume to approximate at least 400 ppm based on the total system evaporative cooling water volume.

Ultimately, the conditioner injection raised the pH of the evaporative cooling water entering the reaction chamber tank 544 to approximately 8.5-14, resulting, as expected, in suspended calcium carbonate solids precipitating from the evaporative cooling water into the tank. These solids, being heavier than water, tended to gravitate toward the bottom of the tank. The presence of the buffer, however, is believed to have caused the formation of calcium acetate or calcium chelate, causing the precipitating solids to remain in a fluid consistency.

As depicted in FIG. 5, the evaporative cooling water exiting the tank inlet 546 established a substantially circular circulation pattern 549, providing sufficient agitation for the mixing required within the tank 544.

As the evaporative cooling water continued to circulate, the evaporative cooling water in the tank continued to mix with the incoming evaporative cooling water, such that the evaporative cooling water in the tank, particularly in the lower portion, accumulated both the precipitating suspended solids, the conditioner, and the calcium acetate and/or calcium chelate, such that the evaporative cooling water in the tank continuously acquired an even higher pH. As the evaporative cooling water continued to circulate, a "fluid bed" 582 developed in the bottom of the tank having a pH of approximately 8.5-14, typically 9.5-10.5. Precipitated solids tended to migrate down the sides of the cone-shaped tank bottom 547, gaining in thickness and density toward the bottom of the cone portion, while maintaining a drainable consistency.

At this stage, the fluid bed 582 included the increased concentration of conditioner, buffer, calcium acetate and/or calcium chelate, and a growing amount of precipitated suspended solids, all in a sludge consistency, capable of flowing in typical piping. It was clear that the presence of the buffer in the fluid bed prevented the solidification of the precipitated solids, causing the fluid bed to remain fluid. It is believed that this is due to the size reduction of the calcium carbonate solids, as at least some of the hardness ions reacted with the buffer to form calcium acetate or calcium chelate. This fluid bed became heavier and heavier relative to the evaporative cooling water, the fluid bed developing as a soft sludge, and became well established in the lower portion of the tank 544. As this was developing the evaporative cooling water exiting the tank through the upper outlet was observed to become less and less turbid, and finally clear. This indicated a substantial reduction in dissolved solids and hardness. This also indicated a satisfactory fluid bed accumulation, in that the evaporative cooling water entering the tank was mixing well with the fluid bed as the entering water was forced into the fluid bed, the mixing action causing an accelerated reduction of hardness, as the evaporative cooling water exited the tank through the upper outlet 48.

At this point in the eighth example, where the evaporative cooling water exiting the upper outlet 48 became substantially clear, the conditioner injection was slowed down in incremental stages until the process had reached an acceptable status, i.e. a hardness concentration for the total evaporative cooling system of less than approximately 450 ppm, while precipitated, suspended solids continued to be added to the fluid bed 582 in the lower portion of the tank 544.

It is desirable to regulate the height of the fluid bed 582. For this purpose, the lower outlet 550 was positioned at a height on the tank 544 that was anticipated to be a minimum height for the fluid bed within the tank. During this experiment, samples were taken from the lower outlet 550 by manually operating the valve 52 from time to time to determine if the fluid bed (easily recognizable because of its increasingly high concentration of suspended solids) had grown to the height of the lower outlet in the tank. At a point following the observation of clear water at the upper outlet 48, and the incremental reduction in the amount of conditioner injection, a sample at the lower outlet indicated that the fluid bed had exceeded the level of the lower outlet. The tank was then "blown down" until the fluid bed above the level of the lower outlet was discharged through the lower outlet and into a sewer. As previously discussed for the exemplary embodiment for FIG. 2, for an ongoing operation, this is the total blowdown for the entire evaporative cooling system, and the discharged evaporative cooling water was noted to be approximately 250,000 ppm, as total hardness.

It was determined, for the exemplary embodiment depicted in FIG. 5, that an acceptable range of pH for the evaporative cooling water entering the tank is 8.8-11.5. This pH is measured at the supply line pH monitor 70.

As was the case for the exemplary embodiment depicted in FIG. 2, significant and desirable reactions occurred within the reaction chamber 542, but it is not desirable to permit evaporative cooling water with an increased pH to return to the evaporative cooling tower basin 13, since increased pH would encourage solids to precipitate while evaporative cooling water was being warmed at the heat exchanger 16. For the exemplary embodiment of FIG. 5, the injection of the buffer to the evaporative cooling water exiting the tank 544 reduces the pH, forming calcium acetate or calcium chelate with the remaining hardness ions in the evaporative cooling water, essentially neutralizing this otherwise undesirable effect of raising the pH with the conditioner at the tank entry.

As was the previously described case with respect to the exemplary embodiments of FIG. 2, the addition of the buffer, an organic acid, further reduces the likelihood of solids precipitation at the heat exchanger, because the solids are more soluble in the organic acid when the temperature rises. Although this will, to some extent, raise the amount of solids precipitating in the cooling tower basin 13, where the temperature falls, it remains that it is more desirable to have such precipitation in the cooling tower basin than the heat exchanger, because scale in the basin is much easier to clean and will not negatively effect the performance of the heat exchanger 16.

As a result of the experimentation conducted in this example, it was determined, for the exemplary embodiment depicted in FIG. 5, that an acceptable pH reduction target, achieved through regulating the amount of buffer injected, is 0.1-0.4, optimally 0.2-0.4, as measured at the conditioned water return line pH monitor 72. Such experimentation also allowed a determination that a satisfactory reaction time in the reaction chamber tank 544, for a given portion of the evaporative cooling water, is 1-60 seconds, optimally approximately 3 seconds. Similarly, it was also estimated that from 0.2-3.5 pounds of buffer is required for each pound of hardness entering the evaporative cooling system in the makeup water.

The experimentation in this exemplary embodiment depicted in FIG. 5 indicated that the fluid bed 582 has a soft sludge consistency that allows it to flow through standard piping, such as the tank lower outlet 550 and electronic valve 52. This sludge, in the tank, typically contains from 0.25-4 pounds of hardness per gallon. The sludge exiting the tank through the tank lower outlet will typically contain from 0.5-2 pounds of hardness per gallon.

Such experimentation also led to the observation that, when the fluid bed 582 has been established and the total evaporative cooling water hardness was stabilized at an acceptable level, the total evaporative cooling water hardness was below 450 ppm, and the buffer concentration ranged from 75-24,000 ppm with a more frequent concentration range of 200-20,000 ppm, calculated based on the volume of buffer added and the evaporative cooling system volume. Similarly, the conditioner concentration was observed to range from 200-40,000 ppm with a more frequent concentration range of 400-40,000 ppm.

The prospective substitutions discussed with respect to the exemplary embodiment of FIG. 2 are also prospectively applicable to the exemplary embodiment depicted in FIG. 5 with analogous effects. These substitutions include sodium hydroxide for potassium hydroxide, calcium hydroxide for potassium hydroxide, and acetic acid for glycolic acid.

Similarly, the functions and operation of the controller 80 are analogous in the exemplary embodiments of FIG. 2 and FIG. 5.

EXAMPLE 9

An exemplary embodiment of the apparatus and processes of the present invention is illustrated in a ninth example with respect to the evaporative cooling system 10. This example involves an alteration of the buffer injected at buffer injection pump 68 as shown in FIG. 5. A corrosion inhibitor blend, comprised of 30 percent orthophosphate and 70 percent polyphosphate in a 50 percent water solution, was added with the buffer of Example 8 to make an inhibited buffer solution. The ratio of corrosion inhibitor blend to buffer was approximately 500 milliliters to 5 gallons. Once established in the evaporative cooling water it was observed that the fluid bed 582 became softer and even more readily capable of flowing through the lower outlet 550 and the drain 54. Prospectively, it is believed that the inhibited buffer solution will lower the corrosiveness of the evaporative cooling water generally. The evaporate cooling water discharged remained at approximately 250,000 ppm, as total hardness.

EXAMPLE 10

An exemplary embodiment of the apparatus and processes of the present invention is illustrated in a tenth example with respect to the evaporative cooling system 10. This example involves the substitution of a smaller reaction chamber tank for the reaction chamber tank 544 shown in FIG. 5. The tank substitution followed the addition of the corrosion inhibitor blend discussed in Example 9.

In this tenth example, the approximately 85 gallon reaction chamber tank 544 of Example 8, was replaced by an approximately 35 gallon reaction chamber tank with equivalent inlets, outlets, drains and the like. Accumulated fluid bed in the first tank 544 was transferred to the new tank. Both buffer and condition injection volumes were reduced by approximately 50 percent. It was observed that the evaporate cooling water discharged remained at approximately 250,000 ppm, as total hardness, and that it was possible to operate with a total evaporative cooling system hardness of as high as 3,280 ppm. Prospectively, it is believed that even higher total evaporative cooling system hardness, of approximately 5,000 ppm is achievable by further reduction in conditioner and buffer injection volumes.

From the experimentation of Example 10, it is evident that the smaller reaction chamber tank can be used, thus reducing the amount of space required for equipment used in the practice of my invention. It is further evident from the experimentation of Example 10 that a higher total evaporative cooling system hardness is acceptable, with no adverse functional effects. An acceptably higher total evaporative cooling system hardness allows less conditioner and buffer to be used, which reduces the operating expense associated with purchasing the conditioner and buffer.

While the experimentation of this tenth example involved both a tank size reduction and lower amounts of conditioner and buffer, it is believed, prospectively, that the tank size reduction alone increases the efficiency of the process due to the higher turbulence and increased mixing of the water entering the reaction chamber tank with the tank's contents. Also, it is believed, prospectively, that a reduction of either or both of the conditioner and buffer would have increased the total evaporative cooling system hardness in a manner that allowed the process to work in an acceptable manner, even with the original reaction chamber tank 544.

EXAMPLE 11

Another exemplary embodiment of the present invention is illustrated by an eleventh example, wherein the sidestream circulation was approximately 0.049 percent of the total evaporative cooling water recirculation rate. This reduced sidestream circulation was maintained for approximately three days, while evaporative cooling water hardness remained at acceptable levels.

EXAMPLE 12

An exemplary embodiment of the apparatus and processes of the present invention is illustrated in a twelfth example with respect to the evaporative cooling system 10. This example involves a modification to the reaction chamber 542 of FIG. 5, and the manner in which conditioner and buffer are delivered to the modified reaction chamber 742. The modified conditioner delivery is schematically represented in FIGS. 7 and 8, and the modified buffer delivery is schematically represented in FIG. 9.

Figure 7:
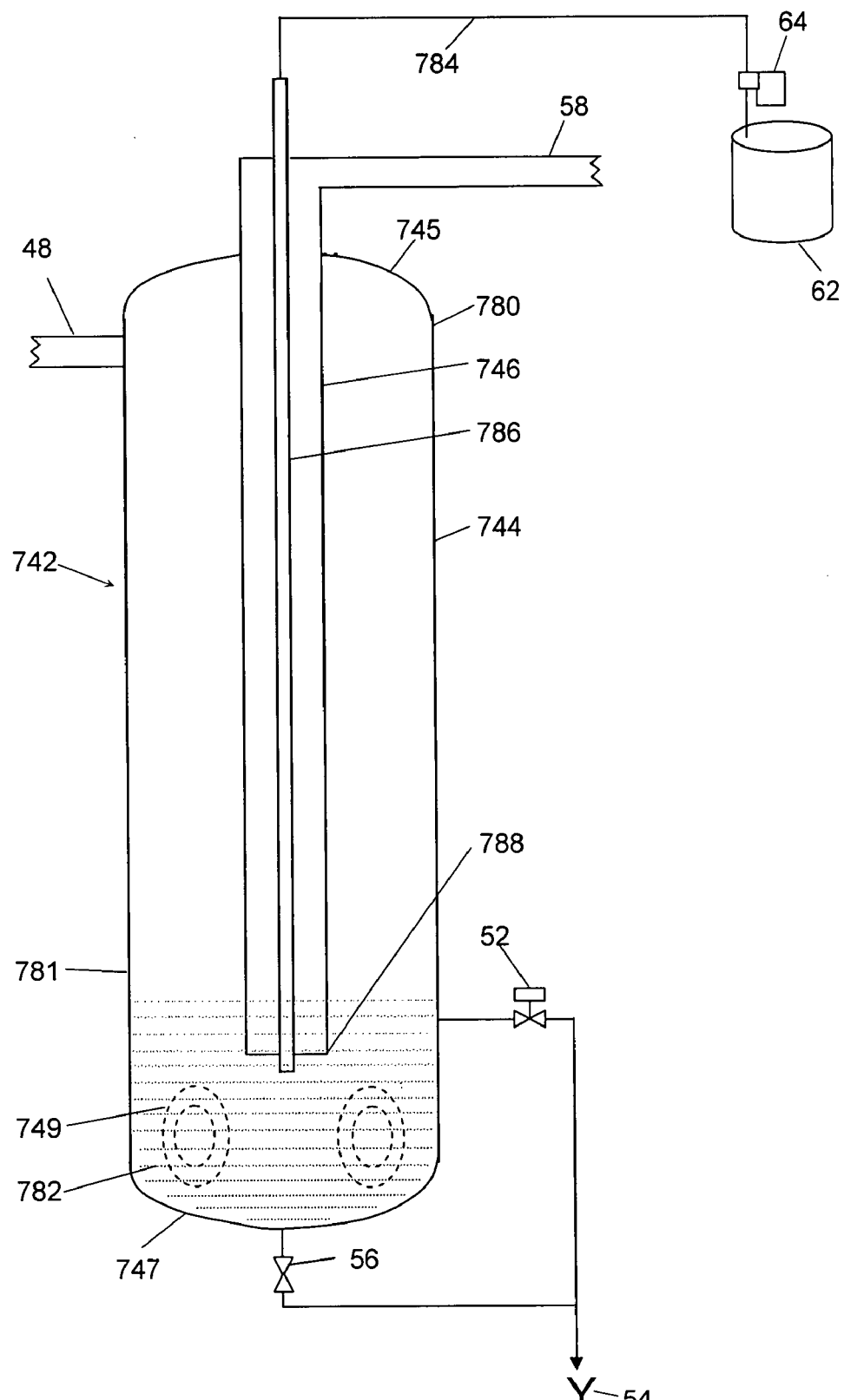
FIG. 7 is a schematic representation of an exemplary embodiment of my apparatus and process wherein the conditioner is routed through the tank inlet to the tank lower portion.

In this twelfth example, and as illustrated in FIG. 7, a reaction chamber tank inlet 746 enters the tank 744 at the top 745 of the tank, which is a pressured tank. The tank inlet 746 extends downwardly through an upper portion 780, and into a lower portion 781 of the reaction chamber tank to approximately 12 inches from the tank bottom 747. Instead of being injected into the sidestream supply line 58, the conditioner addition system in this exemplary embodiment uses the conditioner pump 64 to move conditioner from the conditioner supply 62 in a first conditioner line 784 that supplies conditioner to a second conditioner line 786, the combined conditioner lines extending through the top of the tank 744 and into the tank inlet 746. The second conditioner line 786 extends through substantially the entire length of the tank inlet 746. In some exemplary embodiments of the present invention, the second conditioner line 786 terminates proximate the end 788 of the tank inlet, while in others the second conditioner line terminates well below, and even to the tank bottom 747.

Figure 8:
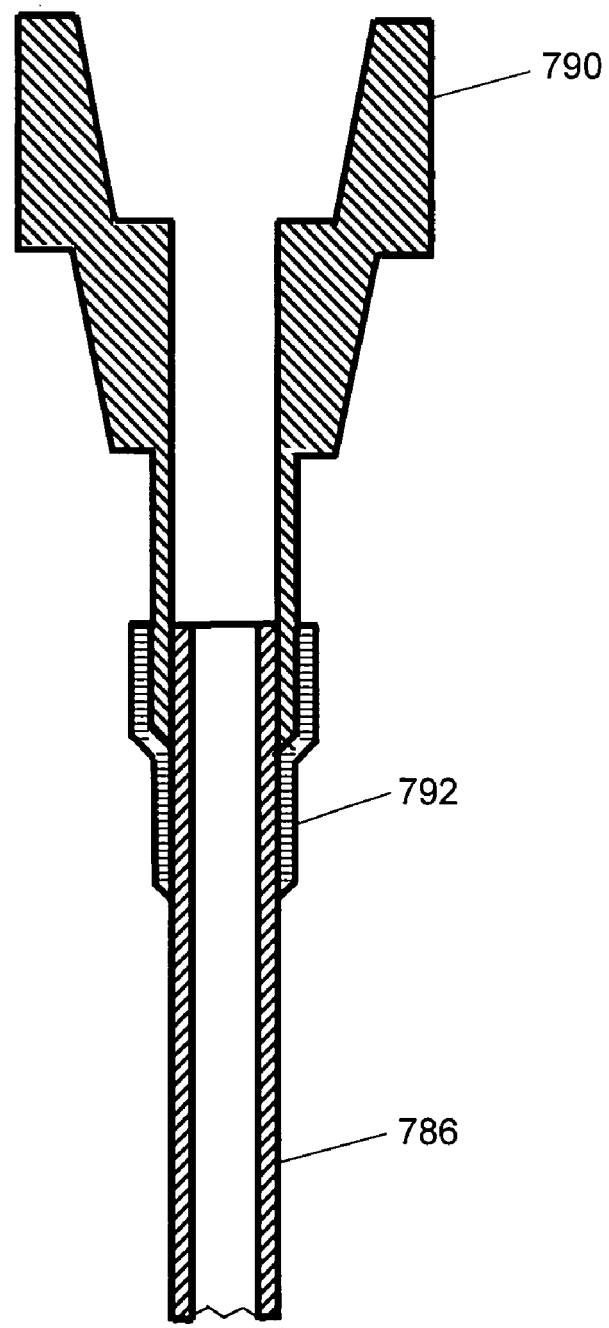
FIG. 8 is a partially sectional side view of an injector used to combine conditioner lines in an exemplary embodiment of my apparatus and process.
Figure 9:
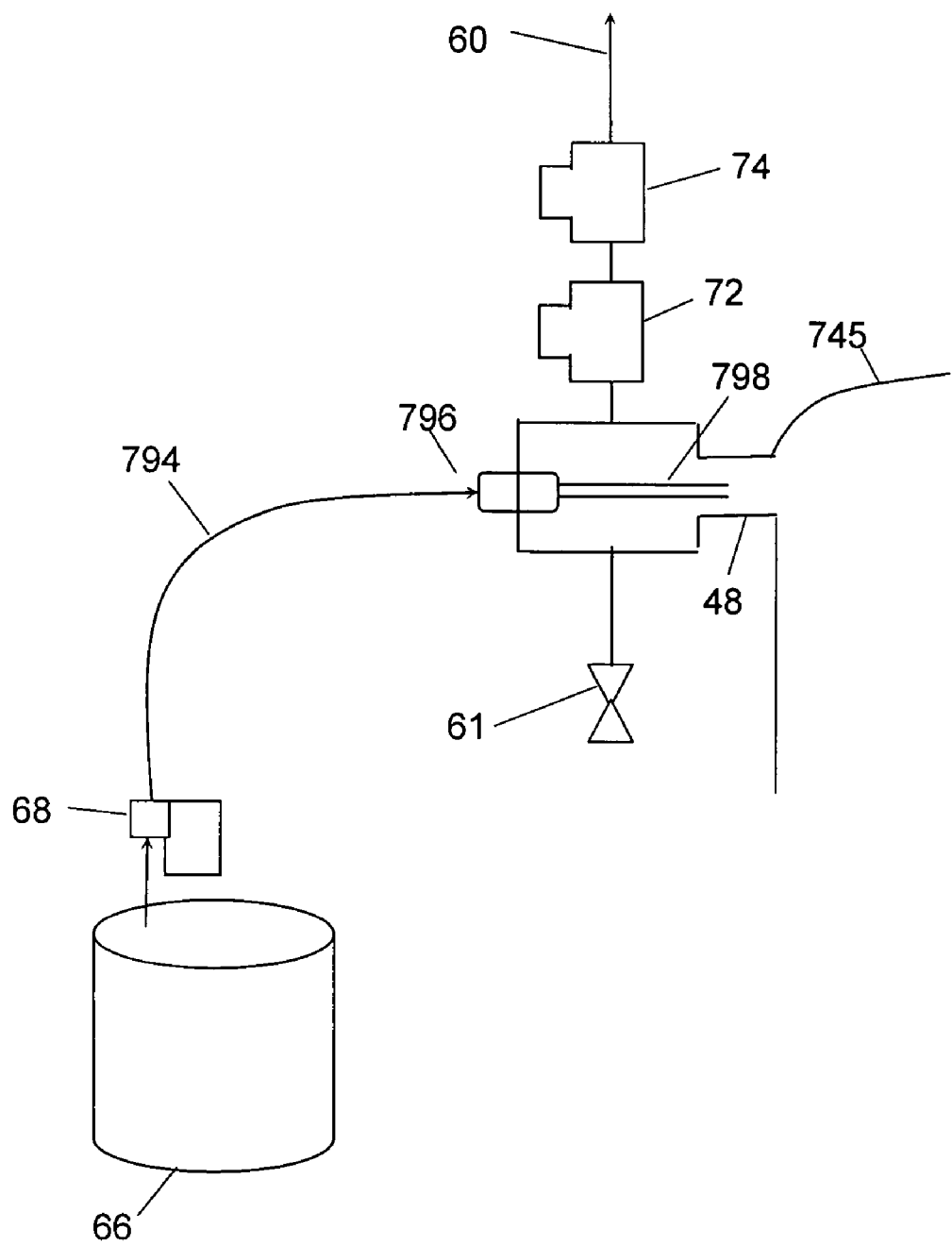
FIG. 9 is a schematic representation of an exemplary embodiment of my apparatus and process wherein the buffer is injected upstream of the pH sensor.

Turning now to FIG. 8, wherein is illustrated the manner in which the first and second conditioner lines 784,786 of FIG. 7 are combined to enter the reaction chamber tank inlet 746. The first conditioner delivery line 784 from the pump 64 is typically constructed from ¼" to ½" outer diameter, flexible polyvinylchloride tubing which extends over the reaction chamber and is threadably attached, using conventional means, to an injector 790, the injector having an interior diameter (typically ¼" to ½") that corresponds with the outer diameter of the polyvinylidene fluoride tubing that forms the second conditioner line 786 that extends within the tank inlet 746. This tubing is inserted in the injector 790 with heat shrinkable tubing 792 placed about the joinder of the second conditioner line tubing and the injector and is heated to secure the tubing within the injector.

A benefit provided by the second conditioner line 786 within the reaction chamber tank inlet 746 is that the conditioner does not mix with sidestream water from supply line 58 until the sidestream water has moved along most of the length of the tank inlet 746. When the conditioner is allowed to mix with such sidestream water at a point farther upstream, it is possible for reactions to begin at a less than optimum point, and leave deposits in the tank inlet 746 that can eventually plug the tank inlet. This possibility is practically eliminated by allowing the first contact of conditioner with sidestream water to occur near the end of, or completely out of the tank inlet 746. Confidential and experimental tests evaluated a range of second conditioner line 786 termination points from as high as 2 inches above the lower end of the tank inlet 746 to the tank bottom 747, with all elevations achieving the desired results.

Additional confidential and experimental tests were conducted to evaluate the injection of conditioner directly into the side of the tank lower portion. While this was functional and achieved the desired result of practically eliminating deposits in the reaction chamber tank inlet 746, it is a less than optimum technique in that deposits eventually plugged the conditioner injection nozzle at the tank. To remove the deposits required injection nozzle removal and drainage of the fluid bed from the tank.

An additional advantage of the second conditioner line 786 being placed within the reaction chamber tank inlet 746, is that the conditioner line can be removed for inspection without draining the fluid bed 749 from the tank 744.

Turning now to FIG. 9, wherein an exemplary embodiment of the present invention is shown to include an additional configuration of the tank upper outlet 48, the conditioned water return line 60, the buffer supply 66, the buffer injection pump 68, the pH sensor 72 and the hardness sensor 74. In the additional configuration of some exemplary embodiments, the buffer is pumped through buffer delivery line 794 and is injected upstream of the pH sensor and, in some exemplary embodiments, is injected proximate the tank upper outlet through an injector 796 having an extension conduit 798 attached. The buffer delivery line 794 is typically ¼"-½" outside diameter flexible polyvinylchloride tubing, and the extension conduit 798 is typically ¼"-½" polyvinylidene fluoride tubing. The injector 796 is similar to the injector 790 used for the first and second conditioner lines 784, 786, is used to combine the buffer delivery line 794 and the extension conduit 798. In confidential and experimental tests of such additional configurations, the buffer was shown to continually clean the pH sensor. An additional advantage, as a result of the proximity of the injected buffer to the upper tank outlet, is that in infrequent instances where fluid bed exits through the tank upper outlet ("carry over"), the buffer was shown to assist in reducing or eliminating the unwanted material from returning to the system.

In other exemplary embodiments, the first and second conditioner lines 784,786, the buffer delivery line 794 and the extension conduit 798 are constructed from either polytetrafluoroethylene, fluorinated ethylene propylene, or perfluoroalkoxy.

EXAMPLE 13

An exemplary embodiment of the apparatus and processes of the present invention is illustrated in a thirteenth example with respect to the evaporative cooling system 10. This example, schematically illustrated in FIG. 10, enhanced the process described in Example 12, including the features of FIGS. 7-9, by causing the sidestream circulation water entering the reactor 742 from supply line 58 to be rotated as it enters the tank inlet 746, also referred to as a "standpipe". This results in a downwardly progressing swirling pattern through the standpipe 746, which in turn adds a mixing benefit proximate the standpipe end 788.

Figure 10:
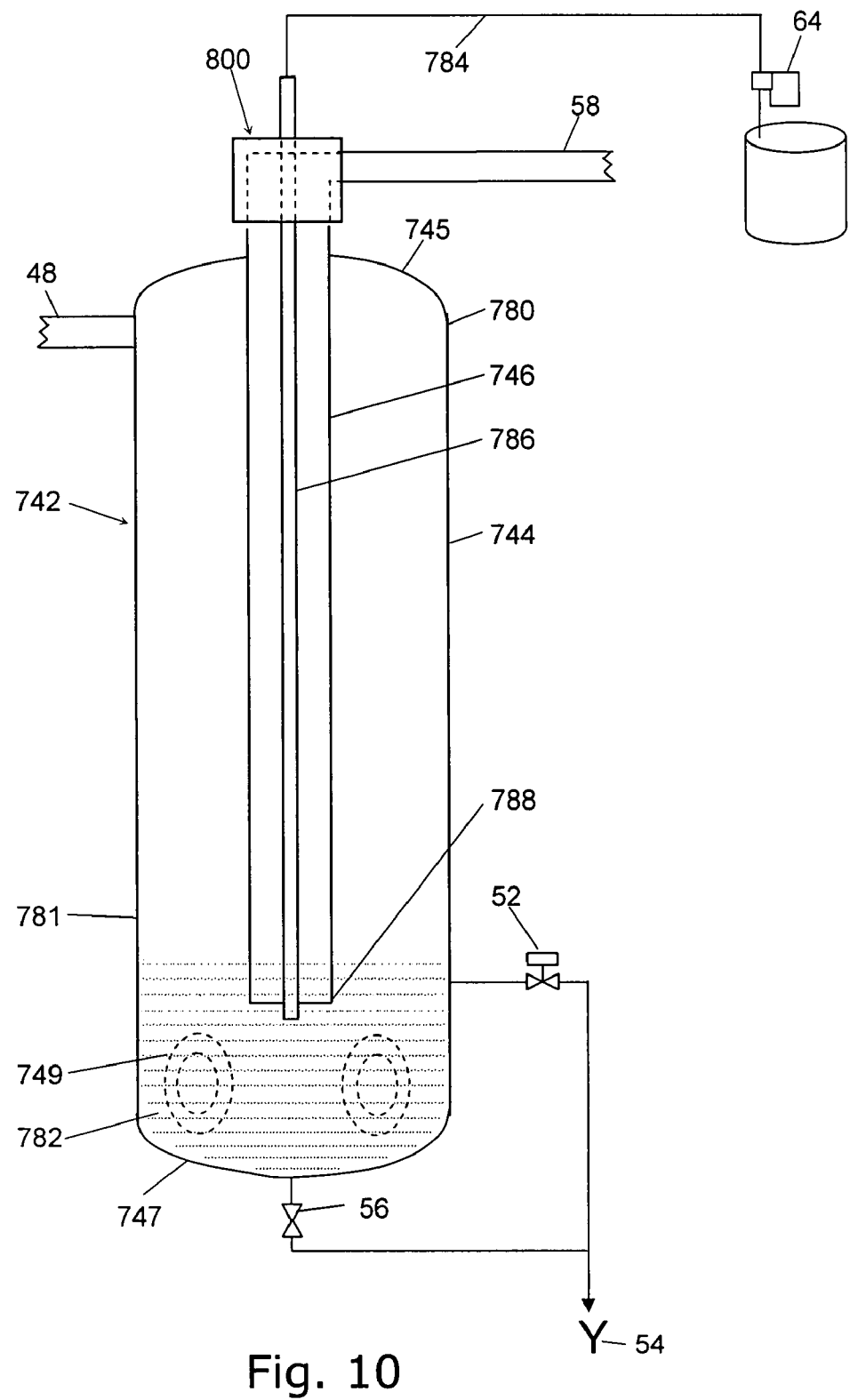
FIG. 10 is a schematic representation of an exemplary embodiment of my apparatus and process wherein the conditioner is routed through the tank inlet to the tank lower portion with a rotation mixer added.
Figure 11:
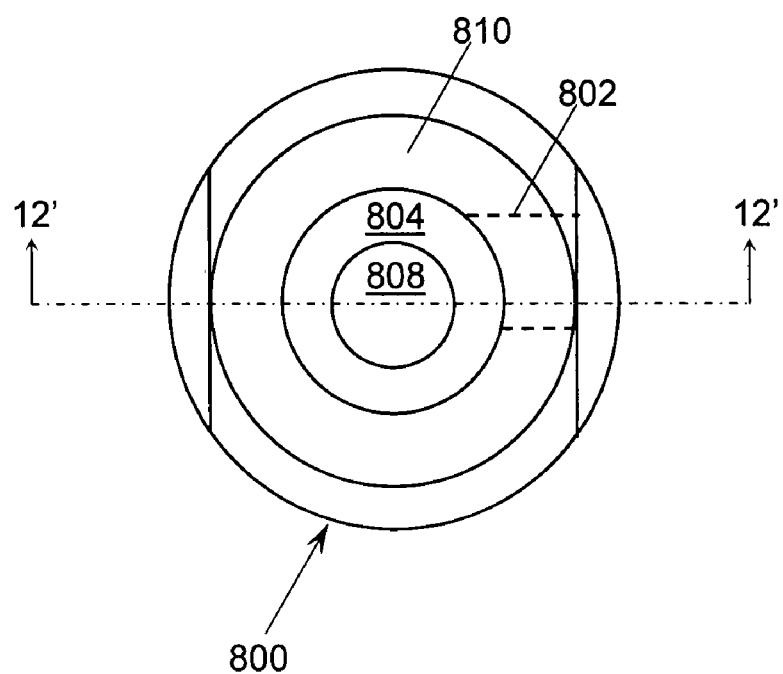
FIG. 11 is a top view of the rotation mixer of FIG. 10.

In this exemplary embodiment, and as illustrated in FIGS. 10-14, the rotation is accomplished using a rotation mixer 800, which receives the sidestream circulation water from supply line 58 through a threaded rotation mixer port 802, the supply line 58 being screwed into the rotation mixer port 802. The rotation mixer has an interior chamber 804, into which the rotation mixer port 802 delivers the sidestream circulation water. As illustrated in FIG. 11, the rotation mixer port 802 is not aligned on the center of the interior chamber 804. This non-alignment causes sidestream circulation water from the port 802 to encounter the upper side (using the top view orientation on FIG. 11 for reference) of the interior chamber 804 and to rotationally follow the side of the interior chamber 804 as gravity pulls the sidestream circulation water downward.

Figure 12:
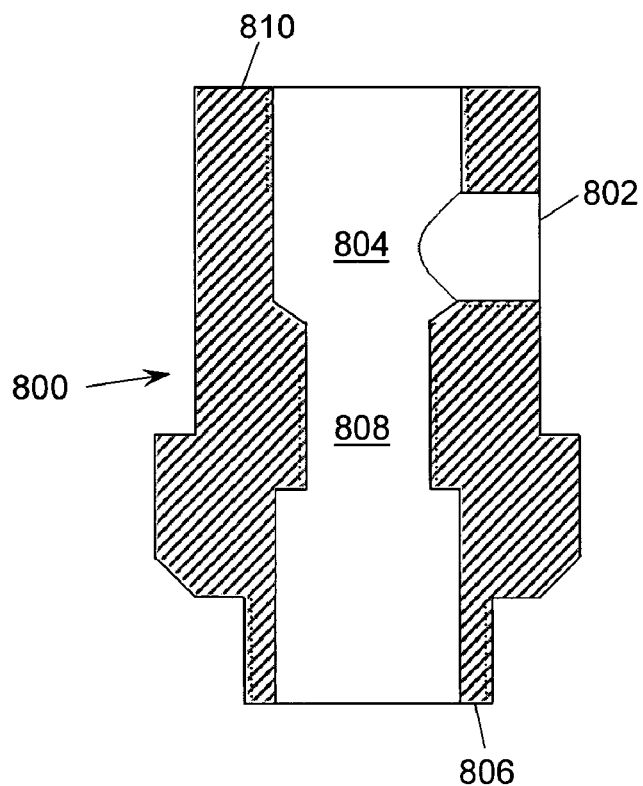
FIG. 12 is a sectional front view of the rotation mixer of FIG. 10 cut along section line 12-12' as shown on FIG. 11, with threads represented by dotted lines.
Figure 13:
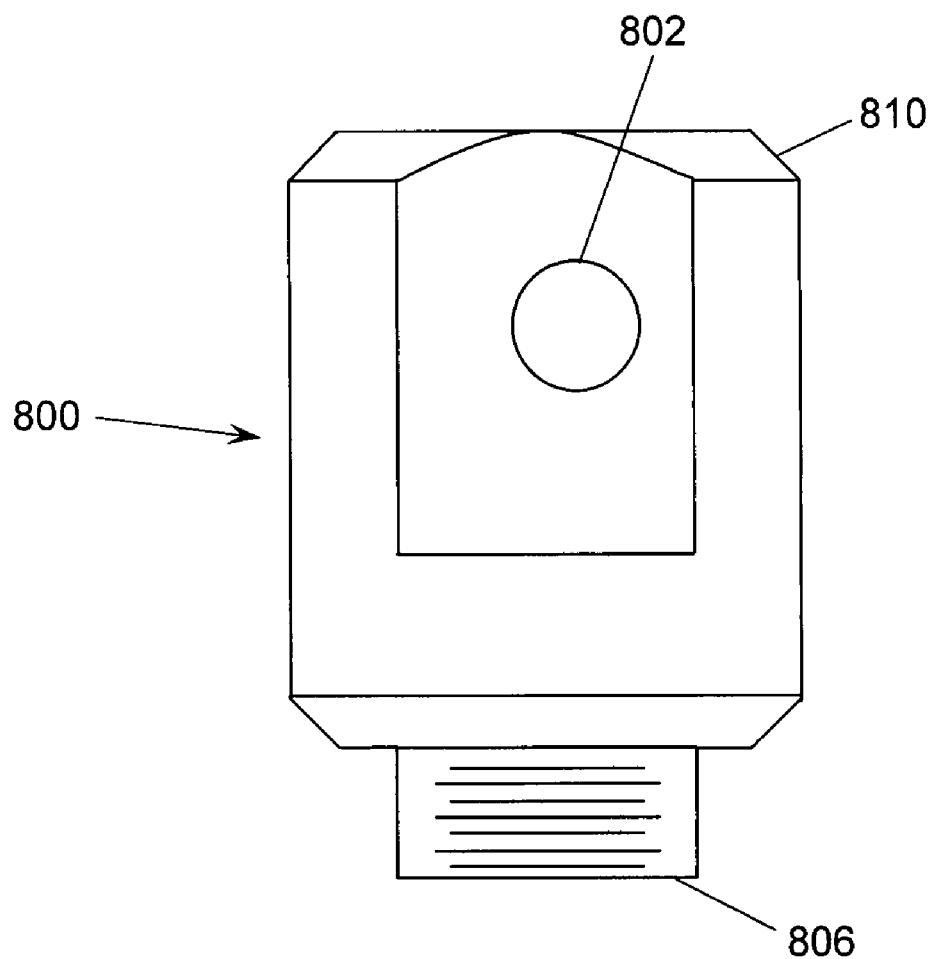
FIG. 13 is a side view of the rotation mixer of FIG. 10.
Figure 14:
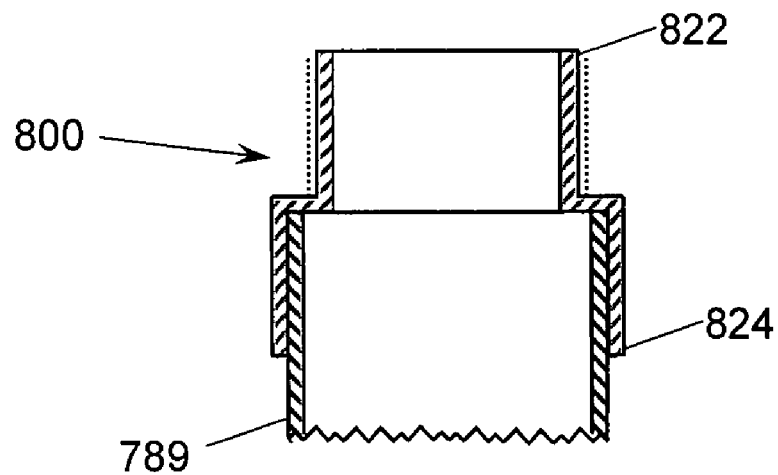
FIG. 14 is a sectional view of a fitting and a standpipe portion, with threads represented by dotted lines.

As further illustrated in FIGS. 12-13 for the exemplary embodiment of this thirteenth example, the rotation mixer interior chamber 804 is open at the bottom 806 for connection to the standpipe 746. FIG. 14 illustrates a PVC fitting 820 having a threaded end 822 and a bottom end 824 for attachment to the top end 789 of the standpipe 786. The rotation mixer 800 has a threaded interior chamber portion 808 which threadably receives the PVC fitting threaded end 822 for final connection of the standpipe 786 to the rotation mixer 800.

Turning again to FIG. 10, wherein, for the exemplary embodiment in this thirteenth example, the first conditioner line 784 enters the rotation mixer top 810 and is connected to the second conditioner line 786, in a similar manner to that described above with respect to the twelfth example, as illustrated in FIG. 8. The second conditioner line 786, also referred to as a "stinger," extends through the rotation mixer interior chamber 804 and into the standpipe 746, with the available materials, sizes, and lengths of the stinger, and the positional relationship of the stinger 786 to the standpipe 746, being described above with respect to the twelfth example. Additionally, an acceptable standpipe 746 may be constructed from one-inch internal diameter, Schedule 40, polyvinylchloride piping, and the rotation mixer 900 is constructed from polyvinylchloride. The size of, and materials for, the standpipe, the standpipe attachment to the rotation mixer, the rotation mixer, the tank and other components and chemical concentrations of the present invention, may be adjusted to accommodate much larger evaporative cooling systems, as will be apparent to persons of ordinary skill in the art. Prospectively, standpipe internal diameters of 10 inches are likely to be suitable for very large cooling systems, reactor tanks may hold thousands of gallons, and larger rotation mixers may be constructed from nylon and/or stainless steel.

Prospectively, the addition of the rotation mixer 800 will enhance the reaction process in the reactor, without a stinger, where the conditioner mixes with the downwardly swirling water while in the standpipe. As discussed in the twelfth example above, however, reactions can begin in the standpipe and lead to standpipe clogging.

In this exemplary thirteenth example, the initiation was analogous to the process described above in the eighth example, with overall performance remaining satisfactory. For example, liquid potassium hydroxide was again chosen for the conditioner, using commercially available product that was 45 percent active potassium hydroxide and 55 percent water. Liquid glycolic acid was again chosen for the buffer, using commercially available product that was 70 percent active and 30 percent water. The tank 742 volume was approximately 35 gallons.

At the beginning of the process in this example the evaporative cooling water had high turbidity due in large part to the presence of solids. The process was initiated by first injecting a buffer, glycolic acid, in amounts calculated to approximate at least 200 ppm concentration of glycolic acid based on the total system evaporative cooling water volume, and then rapidly injecting a conditioner, potassium hydroxide in a volume to approximate at least 400 ppm based on the pH of sidestream circulation water leaving the reactor, the goal being a pH between 9.2 and 11. A corrosion inhibitor blend, comprised of 30 percent orthophosphate and 70 percent polyphosphate in a 50 percent water solution, was added with the buffer, analogously with the ninth example, to make an inhibited buffer solution. The ratio of corrosion inhibitor blend to buffer was approximately 1 liter to 5 gallons, although a blend of approximately 500 milliliters to 5 gallons is also acceptable.

Ultimately, the conditioner injection raised the pH of the sidestream circulation water entering the reaction chamber tank 742 to approximately 8.5-14, resulting, as expected, in suspended calcium carbonate solids precipitating from the sidestream circulation water into the tank. These solids, being heavier than water, tended to gravitate toward the bottom of the tank. The presence of the buffer, however, is believed to have caused the formation of calcium carbonate or calcium chelate, causing the precipitating solids to remain in a fluid consistency. The sidestream circulation water exiting the standpipe end 788 established a substantially circular circulation pattern 749, providing sufficient agitation for the mixing required within the tank 744.

As the evaporative cooling water continued to circulate, the sidestream circulation water in the tank continued to mix with the incoming sidestream circulation water, such that the sidestream circulation water in the tank, particularly in the lower portion, accumulated both the precipitating suspended solids, the conditioner, and the calcium carbonate and/or calcium chelate, such that the sidestream circulation water in the tank continuously acquired an even higher pH. As the sidestream circulation water continued to circulate, a "fluid bed" 782 developed in the bottom of the tank having a pH of approximately 8.5-14, typically 9.2-10.5. Precipitated solids tended to migrate down the sides of the cone-shaped tank bottom 747, gaining in thickness and density toward the bottom of the cone portion, while maintaining a drainable consistency.

At this stage, the fluid bed 782 included an increased concentration of conditioner, buffer, calcium carbonate and/or calcium chelate, and a growing amount of precipitated suspended solids, all in a sludge consistency, capable of flowing in typical piping. It was clear that the presence of the buffer in the fluid bed prevented the solidification of the precipitated solids, causing the fluid bed to remain fluid. It is believed that this is due to the size reduction of the calcium carbonate solids, as at least some of the hardness ions reacted with the buffer to form calcium carbonate or calcium chelate. This fluid bed became heavier and heavier relative to the evaporative cooling water, the fluid bed developing as a soft sludge, and became well established in the lower portion of the tank 747. As this was developing the sidestream circulation water exiting the tank through the upper outlet was observed to become less and less turbid, and finally clear. This indicated a substantial reduction in dissolved solids and hardness. This also indicated a satisfactory fluid bed accumulation, in that the sidestream circulation water entering the tank was mixing well with the fluid bed as the entering water was forced into the fluid bed, the mixing action causing an accelerated reduction of hardness, as the sidestream circulation water exited the tank through the upper outlet 48.

At this point in the thirteenth example, when the sidestream circulation water exiting the upper outlet 48 became substantially clear, the conditioner injection was slowed down in incremental stages until the process had reached an acceptable status, i.e. a hardness concentration for the total evaporative cooling system of less than approximately 1800 ppm, while precipitated, suspended solids continued to be added to the fluid bed 782 in the lower portion of the tank 744. Field experience, such as that achieved during the thirteenth example experiment, has suggested that a total evaporative cooling system hardness concentration of up to approximately 1800 ppm is acceptable, in that a time buffer is provided, in the event of an inadvertent chemical depletion, etc. A period for system restoration as long as two days is typically provided if the problem was encountered while the total system hardness concentration was 1800 ppm or less.

During this thirteenth example experiment, samples were taken from the lower outlet 750 by manually operating the valve 52 from time to time to determine if the fluid bed (easily recognizable because of its increasingly high concentration of suspended solids) had grown to the height of the lower outlet in the tank. At a point following the observation of clear water at the upper outlet 48, and the incremental reduction in the amount of conditioner injection, a sample at the lower outlet indicated that the fluid bed had exceeded the level of the lower outlet. The tank was then "blown down" until the fluid bed above the level of the lower outlet was discharged through the lower outlet and into a sewer. As previously discussed, for an ongoing operation, this is the total blowdown for the entire evaporative cooling system, and the discharged evaporative cooling water was noted to be approximately 250,000 ppm, as total hardness. It was determined, for the exemplary embodiment depicted in FIG. 10 and represented in this thirteenth example, that an acceptable range of pH for the evaporative cooling water entering the tank is 8.2-11.5.

As was the case in earlier examples, significant and desirable reactions occurred within the reaction chamber 742, but it is not desirable to permit evaporative cooling water with an increased pH to return to the evaporative cooling tower basin 13, since increased pH would encourage solids to precipitate while evaporative cooling water was being warmed at the heat exchanger 16. For the exemplary embodiment of FIG. 10, the injection of the buffer to the sidestream circulation water exiting the tank 744 reduces the pH, forming calcium chelate with the remaining hardness ions in the sidestream circulation water, essentially neutralizing this otherwise undesirable effect of raising the pH with the conditioner at the tank entry.

As a result of the experimentation conducted in this thirteenth example, it was determined, for the exemplary embodiment depicted in FIG. 10, that an acceptable pH reduction target, achieved through regulating the amount of buffer injected, is 0.1-0.4, optimally 0.2-0.4. Such experimentation also allowed a determination that a satisfactory reaction time in the reaction chamber tank 744, for a given portion of the evaporative cooling water, is 1-60 seconds, optimally approximately 3 seconds. Similarly, it was also estimated that from 0.2-3.5 pounds of buffer is required for each pound of hardness entering the evaporative cooling system in the makeup water.

The experimentation in this exemplary embodiment depicted in FIG. 10 indicated that the fluid bed 782 has a soft sludge consistency that allows it to flow through standard piping, such as the tank lower outlet 750 and electronic valve 52. This sludge, in the tank, typically contains from 0.25-4 pounds of hardness per gallon. The sludge exiting the tank through the tank lower outlet will typically contain from 0.5-2 pounds of hardness per gallon.

Such experimentation also led to the observation that, when the fluid bed 782 has been established and the total evaporative cooling water hardness was stabilized at an acceptable level, the total evaporative cooling water hardness was below 1800 ppm, and the buffer concentration ranged from 75-24,000 ppm with a more frequent concentration range of 200-20,000 ppm, calculated based on the volume of buffer added and the evaporative cooling system volume. Similarly, the conditioner concentration was observed to range from 200-40,000 ppm with a more frequent concentration range of 400-40,000 ppm.

The prospective substitutions discussed with respect to the exemplary embodiment of FIG. 2 are also prospectively applicable to the exemplary embodiment depicted in FIG. 10 with analogous effects. These substitutions also include sodium hydroxide, calcium hydroxide, or ammonium hydroxide for potassium hydroxide, and ascorbic, citric, or acetic acid for glycolic acid.

Similarly, the functions and operation of the controller 80 are analogous in the exemplary embodiments of FIG. 2 and FIG. 10.

Prospectively, the conditioner may be added to the reaction chamber lower portion by running a line through the top, side or bottom of the reaction chamber tank 744 and discharging the conditioner in the reaction chamber lower portion 781, generally, or specifically near the standpipe end 788, and may also be added by running a line through the top, side, or bottom of the tank and routing the conditioner line into the standpipe at various points.

EXAMPLE 14

Figure 16:
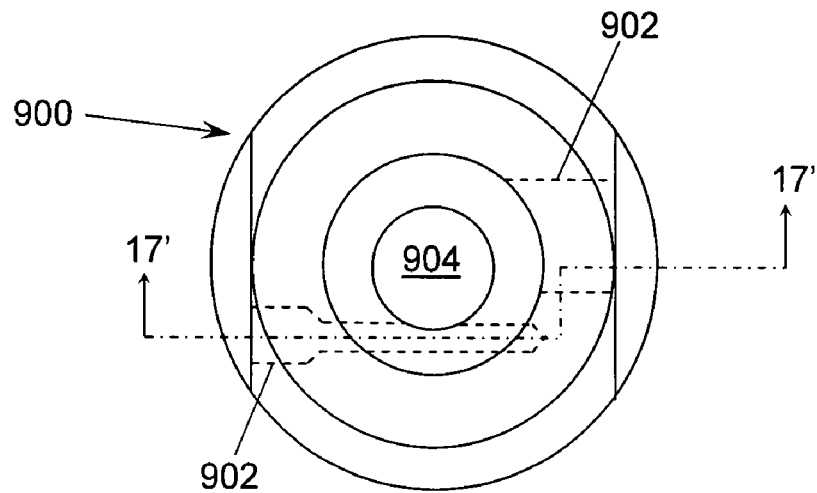
FIG. 16 is a top view of the rotation mixer of FIG. 15.
Figure 17:
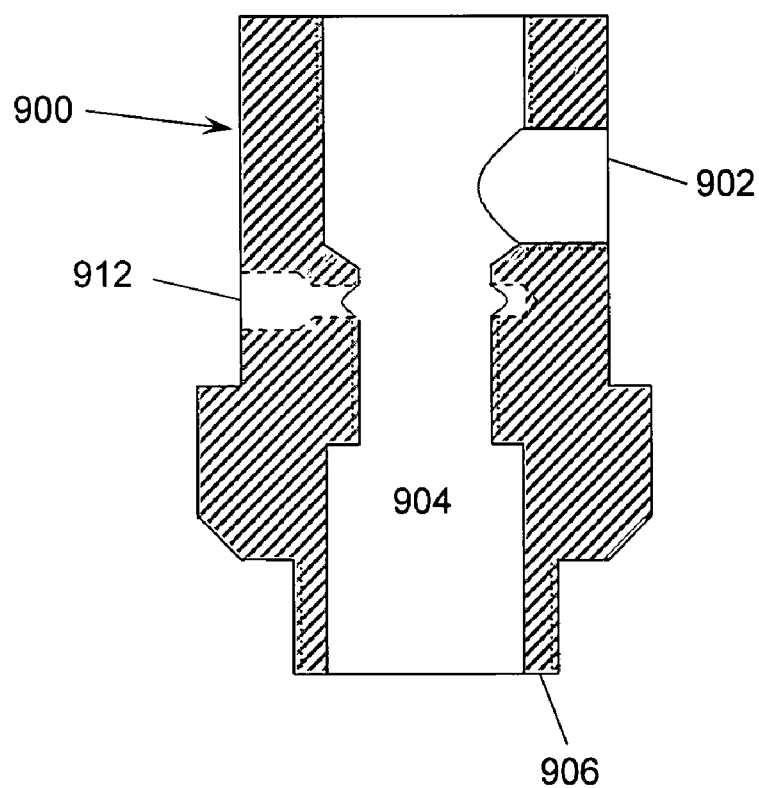
FIG. 17 is a sectional front view of the rotation mixer of FIG. 15 cut along section line 17-17' as shown on FIG. 16, with threads represented by dotted lines.
Figure 18:
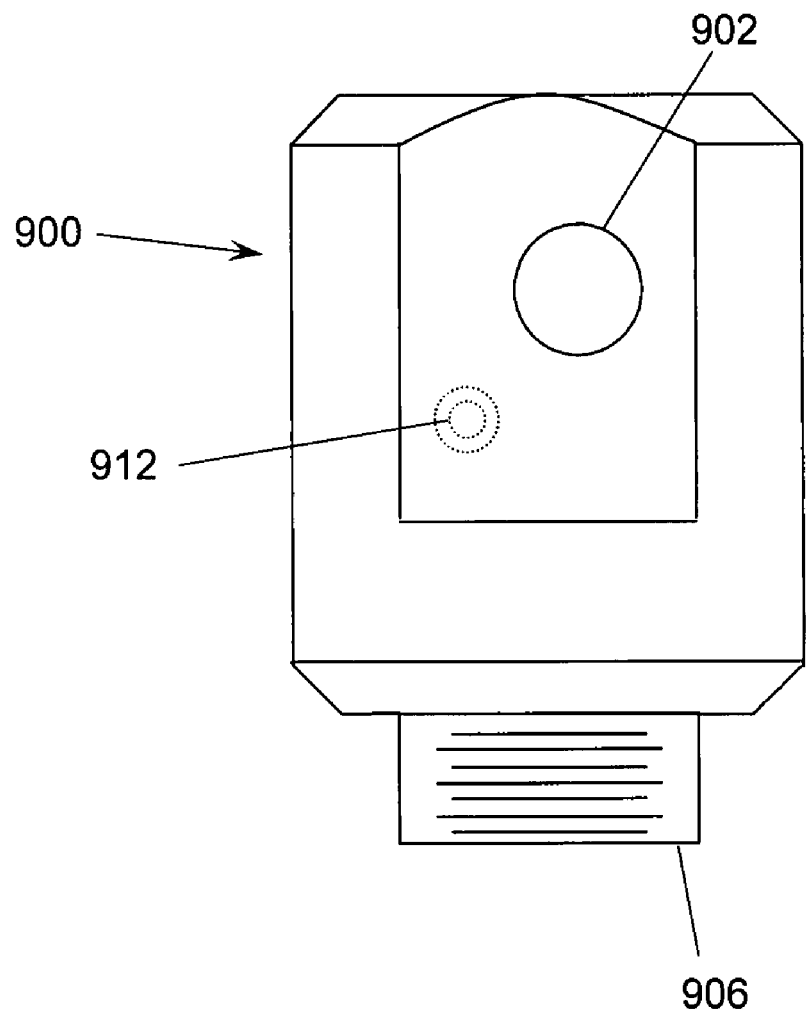
FIG. 18 is a side view of the rotation mixer of FIG. 15.

An exemplary embodiment of the apparatus and processes of the present invention is illustrated in a fourteenth example with respect to the evaporative cooling system 10. This example, schematically illustrated in FIG. 15, enhanced the process described in Example 13, by injecting a polymer into a modified rotation mixer 900, as illustrated in FIGS. 16-18, that receives sidestream circulation water from the supply line 58 through the sidestream circulation water port 902, starts the water into a downwardly swirling motion, exiting the rotation mixer bottom 906, as described in the thirteenth example above. A polymer supply 920 is delivered to the rotation mixer through polymer intake line 922 using polymer pump 924. The rotation mixer 900 has a threaded polymer port 912 for conventional attachment to the polymer intake line 922, the intake line having an injector (not shown) extending to a point within the rotation mixer 900, such that polymer joins the sidestream circulation water in the rotation mixer interior chamber 904. In this exemplary embodiment, the polymer pump 924 pumps polymer at timed intervals, the intervals being set, based on calculations, such that the polymer to sidestream circulation water concentration is approximately 0.4-0.75 ppm, although the beneficial effects of the polymer injection are not limited to this concentration, and may vary depending on the polymer chosen.

The polymer in the reactor 742 reacts and combines with very small particles in sidestream circulation water, such as clay, mud, and unsettled fluid bed particles. The reaction ultimately results in the now heavier combination settling into the fluid bed. Prior to initial experiments with a polymer, however, it was questionable whether a polymer would perform effectively because it was to be added to a very high pH environment, and polymers typically perform poorly in high pH environments, generally.

The polymer was added to clarify the sidestream water exiting the reaction chamber, by speeding the settling of fluid bed particles to the bottom of the reaction chamber. To the extent the settling time is accelerated, less fluid bed carryover into sidestream water exiting the reaction chamber will occur. Fluid bed carryover is an occasional occurrence. The desired clarification occurred after the polymer was added, in spite of the high pH environment. Additionally, an unanticipated improvement was brought about in the ability to quickly measure the hardness in the sidestream water exiting the reaction chamber, the measurement being undertaken chemically, by titration with EDTA, a chelate, using the Hach Co. procedure commonly known and used in the water conditioning industry. Prior to the addition of the polymer, as in the thirteenth example, it was normal that when the end point was reached, the titration test solution slowly reverted from blue to red. A second or third end point had to be achieved before the color was stable, which indicated a higher hardness. After the polymer was added the first end point was stable, which made the titration hardness test more efficient, accurate, and reliable.

Also, after the polymer was added it was observed that hardness measurements of the reactor supply water using the specific ion electrode 74 were more uniform, and measurements were accordingly more accurate and reliable. Additionally, after calibration of the specific ion electrode, the two different measurements, from the titration test and the specific ion electrode, were in much better agreement.

In this fourteenth example, the sidestream water entering the reaction chamber was clear both before and after the polymer was added, evidencing no negative effect on the overall cooling system water by the addition of the polymer. A comparison of hardness measured by titration before and after the polymer addition indicated that the titration measurement had been previously skewed higher by 25 to 100 ppm.

It is now believed that very small particles of fluid bed which contained hardness ions too small to be visible, were in the titration test water samples drawn from sidestream water exiting the reaction chamber. During titration, the reagents most likely dissolved the microscopic particles slowly, causing the correct end point to be delayed. It is also believed that the specific ion electrode measurement was effected less by the presence of such particles, although uniformity of the measurements was negatively effected.

An exemplary embodiment of the type discussed in this fourteenth example was the subject of confidential and experimental testing at the installation where the exemplary embodiment described in the thirteenth was in operation. With no negative effect on overall performance, such experiment indicated that the above-described polymer benefits were achieved when a non-ionic polymer, a food grade copolymer of acrylate an acrylamide, was injected through the rotation mixer 900, in an amount calculated to be 0.5 ppm based on sidestream circulation water volume. During the experiment, the polymer concentration was observed to range from 0.025-5.0 ppm, with a more frequent concentration of 0.5 ppm.

Figure 15:
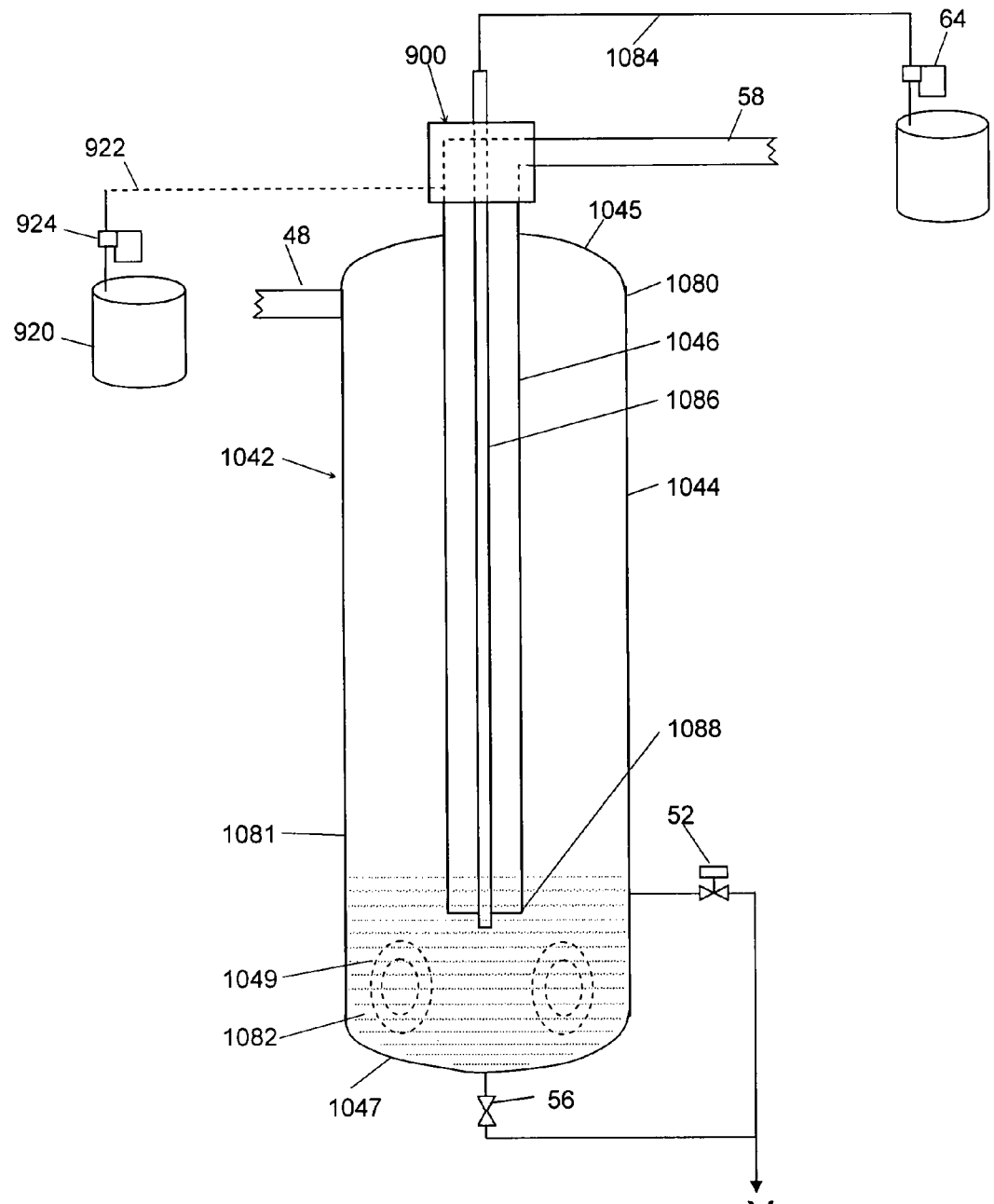
FIG. 15 is a schematic representation of an exemplary embodiment of my apparatus and process wherein the conditioner is routed through the tank inlet to the tank lower portion with a rotation mixer added.

The prospective substitutions discussed with respect to the exemplary embodiment of FIG. 2 are also prospectively applicable to the exemplary embodiment depicted in FIG. 15 with analogous effects. These substitutions also include sodium hydroxide, calcium hydroxide, or ammonium hydroxide for potassium hydroxide, and ascorbic, citric, or acetic acid for glycolic acid.

Prospectively, it is believed that polymer injection will provide the above-described benefits, although to a lesser degree, in embodiments such as the exemplary embodiments of FIGS. 2-5 and FIG. 7.

Prospectively, it is believed that polymer injection will provide the above-described benefits, although to a lesser degree, in embodiments such as the exemplary embodiment of FIG. 10, where the stinger is removed, and the rotation mixer causes the downwardly swirling motion of the sidestream circulation water through the standpipe, along with the conditioner and the polymer.

Prospectively, other polymers, such as the anionic polymer, anionic polacrylamide, and the cationic polymers, acrylamide copolymer and quaternary ammonium polyelectrolite, may be substituted for the polymer described in the above fourteenth example. However, it is not expected that these will perform as well in the high pH environment in the reaction chamber, and a limited experiment suggested a significantly higher volume of acrylamide copolymer was required.

It is commonly known that polymer additives, such as aluminum sulfate, aluminum chloride, ferric sulfate, and ferric chloride can accelerate polymer reactions. Prospectively, one or more of these may be used with the added polymer, with at least some accelerated reaction resulting.

EXAMPLE 15

Figure 19:
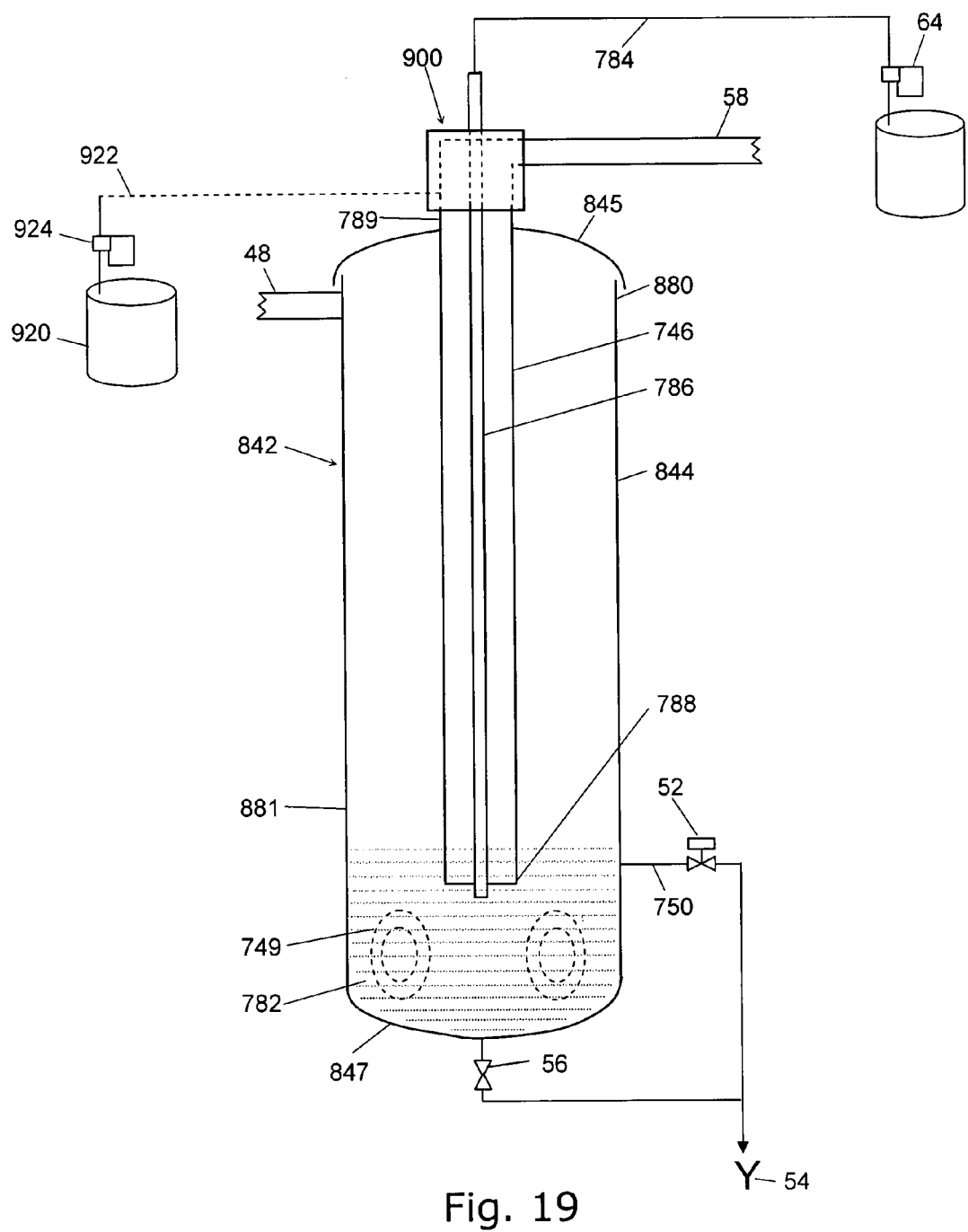
FIG. 19 is a schematic representation of an exemplary embodiment of my apparatus and process wherein the reaction chamber tank is non-pressurable.

An exemplary embodiment of the apparatus and processes of the present invention is illustrated in a fourteenth example with respect to the evaporative cooling system 10. This example, schematically illustrated in FIG. 19, is very similar to the exemplary embodiment illustrated by FIG. 15, with the only substantial change being the use of a reaction chamber 842 with a non-pressurable tank 844, having a removable top 845, an upper portion 880, a lower portion 881, and a bottom 847. In the confidential and experimental tests represented by the fourteenth and fifteenth examples, it was shown that either a pressurable tank, such as tank 744 in the fourteenth example or a non-pressurable tank, such as tank 844 in this fifteenth example, will function sufficiently. For the fifteenth example experiment, an acceptable hardness concentration for the total evaporative cooling system of less than approximately 1800 ppm was again achieved.

Equipment connections described herein may be varied in some exemplary embodiments to include threaded, flange and other connection devices known in the art.

With respect to the above description then, it is to be realized that the optimum apparatus and processes for a particular system wherein water is circulated for repeated use, and for a particular evaporative cooling system, will include chemical, operational facility, and equipment implementations or changes, which will occur to those skilled in the art upon review of the present disclosure.

All equivalent relationships to those illustrated in the drawings and described in the specification are intended to be encompassed by the present invention.

The descriptions in this specification are for purposes of illustration only and are not to be construed in a limiting sense.

I claim:

1. A process for conditioning water, the water being circulated in a system, comprising the steps of:

establishing a circulated water sidestream, from the system, to a reaction chamber, and back to the system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion;

adding a buffer comprising organic acid to the sidestream water exiting the reaction chamber, such that the pH of the sidestream water is lowered prior to returning to the system circulation, at least some of the buffered sidestream water being re-circulated in the sidestream;

adding a conditioner comprising caustic to the reaction chamber lower portion, such that the pH of the sidestream water is elevated, the conditioner being routed through a conduit extending through at least a portion of the inlet;

the conditioner and buffer being added such that mixing of the conditioner, the buffer and the sidestream water within the reaction chamber, causes solids to precipitate from the sidestream water such that the sidestream water exiting the reaction chamber has less dissolved solids than the sidestream water entering the reaction chamber; and removing precipitated solids, conditioner, buffer and some of the sidestream water from the reaction chamber for disposal.

2. The process of claim 1, further comprising the step of causing a swirling of the sidestream water as the sidestream water is being routed through the reaction chamber upper portion.

3. The process of claim 2, further comprising the step of adding a polymer to the sidestream water in the inlet.

4. The process of claim 1, wherein the reaction chamber comprises an upper outlet for discharging the sidestream water back to the system, the process further comprising the step of monitoring the pH of the water returning to the system circulation using a pH sensor, the step of adding a buffer to the sidestream water further comprising the step of adding the buffer to the sidestream water at a point between the reaction chamber and the pH sensor.

5. The process of claim 1, wherein the reaction chamber comprises a tank, the tank having an upper outlet through which sidestream water is discharged for returning to the system circulation, the step of adding a buffer to the sidestream water further comprising adding the buffer to the sidestream water at a point proximate the tank upper outlet.

6. The process of claim 1, further comprising the step of adding a polymer to the sidestream water.

7. The process of claim 6, wherein the amount of polymer added results in a polymer to sidestream circulation water concentration in the range of 0.4-0.75 ppm.

8. The process of claim 6, wherein the amount of polymer added is sufficient to substantially clarify sidestream water prior to the sidestream water being circulated back to the system circulation.

9. The process of claim 6, wherein:

the sidestream water being circulated to the reaction chamber has a total hardness;

the process further comprises the step of electronically measuring the hardness;

the sidestream water being circulated to the reaction chamber contains polymer-combinable particles, the particles interfering with the electronic hardness measurement accuracy and causing measurement inaccuracy; and the amount of polymer added is sufficient to combine with and remove at least some of the interfering particles, such that the electronic hardness measurement accuracy is improved.

10. The process of claim 6, wherein:

the sidestream water being circulated back to the cooling water system from the reaction chamber has a total hardness;

the process further comprises the step of chemically measuring the hardness;

the sidestream water being circulated back to the cooling water system from the reaction chamber contains polymer-combinable particles, the particles interfering with the chemical hardness measurement accuracy and causing measurement inaccuracy; and the amount of polymer added is sufficient to combine with and remove at least some of the interfering particles, such that the chemical hardness measurement accuracy is improved.

11. The process of claim 6, wherein the polymer is premixed with a polymer reaction accelerator additive.

12. The process of claim 11, wherein the additive is selected from the group consisting of aluminum sulfate, aluminum chloride, ferric sulfate, and ferric chloride.

13. The process of claim 6, wherein the step of adding a conditioner to the reaction chamber lower portion further comprises routing the conditioner through a conduit extending through at least a portion of the inlet, and the step of adding a polymer to the sidestream water, further comprises the step of adding the polymer to the sidestream water in the reaction chamber inlet.

14. The process of claim 6, further comprising the step of causing a swirling of the sidestream water as the sidestream water is being routed through the reaction chamber inlet.

15. The process of claim 1, wherein the reaction chamber comprises an upper outlet for discharging the sidestream water back to the system, and the step of removing precipitated solids, conditioner, buffer and some of the sidestream water from the reaction chamber for disposal further comprises removing the precipitated solids, conditioner, buffer and some of the sidestream water from the reaction chamber through a lower outlet.

16. The process of claim 15, wherein the process further comprises the step of periodically draining part of the mixture of precipitated solids, conditioner, buffer, and some of the sidestream water through a drain on the reaction chamber.

17. The process of claim 1, further comprising the step of adding a corrosion inhibitor blend to the sidestream water.

18. The process of claim 17, wherein the corrosion inhibitor blend comprises approximately 30 percent orthophosphate and 70 percent polyphosphate in a 50 percent water solution.

19. The process of claim 1, wherein the step of adding a buffer to the sidestream water exiting the reaction chamber, further comprises the step of adding a corrosion inhibitor blend to the buffer before the buffer is added to the sidestream water.

20. The process of claim 19, wherein the corrosion inhibitor blend comprises approximately 30 percent orthophosphate and 70 percent polyphosphate in a 50 percent water solution, and the ratio of corrosion inhibitor blend to buffer is approximately 500 milliliters to 19 liters.

21. The process of claim 19, wherein the corrosion inhibitor blend comprises approximately 30 percent orthophosphate and 70 percent polyphosphate in a 50 percent water solution, and the ratio of corrosion inhibitor blend to buffer is approximately 1 liter to 19 liters.

22. The process of claim 1, further comprising the step of adding a corrosion inhibitor blend to the sidestream water, in amounts such that the mixture of the precipitated solids, conditioner, buffer and sidestream water removed from the reaction chamber for disposal, is softened.

23. The process of claim 1, further comprising the steps of periodically draining part of the mixture of precipitated solids, conditioner, buffer, and some of the sidestream water through a drain on the reaction chamber, and adding a corrosion inhibitor blend to the sidestream water, in amounts such that the mixture of the precipitated solids, conditioner, buffer and sidestream water drained from the reaction chamber through the drain, is softened.

24. The process of claim 1, wherein the water being circulated in the system has a total hardness, the process further comprising the step of adjusting the circulated water hardness by altering the amount of conditioner added.

25. The process of claim 24, wherein the step of adjusting the circulated water hardness by altering the amount of conditioner added, further comprises the steps of:
electronically measuring the hardness; and electronically adjusting the amount of conditioner added, in response to the hardness measurement.

26. The process of claim 1, wherein the water being circulated in the system has a total hardness, the process further comprising the step of adjusting the circulated water hardness by altering the amount of buffer added.

27. The process of claim 26, wherein the step of adjusting the circulated water hardness by altering the amount of buffer added, further comprises the steps of:
electronically measuring the hardness; and electronically adjusting the amount of buffer added, in response to the hardness measurement.

28. A conditioning system for conditioning water, the water being circulated in another system, the conditioning system comprising:
a reaction chamber;
means for establishing a circulated water sidestream, from the other system, to the reaction chamber, and back to the other system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion;
means for adding a buffer the means for adding a buffer further comprising a buffer supply comprising organic acid to the sidestream water exiting the reaction chamber, such that the pH of the sidestream water is lowered prior to returning to the other system circulation, at least some of the buffered sidestream water being re-circulated in the sidestream;
means for adding a conditioner, the means for adding a conditioner further comprising a conditioner supply comprising caustic, to the reaction chamber lower portion, the means for adding a conditioner to the reaction chamber lower portion further comprising means for routing the conditioner through a conduit extending through at least a portion of the inlet, such that the pH of the sidestream water is elevated;
the conditioner and buffer being addable such that mixing of the conditioner, the buffer, and the sidestream water within the reaction chamber, causes solids to precipitate from the sidestream water such that the sidestream water exiting the reaction chamber has less dissolved solids than the sidestream water entering the reaction chamber; and
means for removing precipitated solids, conditioner, buffer and some of the sidestream water from the reaction chamber for disposal.

29. The conditioning system of claim 28, further comprising means for causing a swirling of the sidestream water in the inlet as the sidestream water is being routed through the reaction chamber upper portion.

30. The conditioning system of claim 29, further comprising means for adding a polymer to the sidestream water in the inlet.

31. The conditioning system of claim 28, wherein the reaction chamber comprises an upper outlet for discharging the sidestream water back to the system, the conditioning system further comprises means for monitoring the pH of the water returning to the system circulation using a pH sensor, and the means for adding a buffer to the sidestream water further comprises means for adding the buffer to the sidestream water at a point between the reaction chamber and the pH sensor.

32. The conditioning system of claim 28, wherein the reaction chamber comprises a tank, the tank having an upper outlet through which sidestream water is discharged for returning to the system circulation, and the means for adding a buffer to the sidestream water further comprises means for adding the buffer to the sidestream water at a point proximate the tank upper outlet.

33. The conditioning system of claim 28, further comprising means for adding a polymer to the sidestream water.

34. The conditioning system of claim 33, wherein the amount of polymer added results in a polymer to sidestream water concentration in the range of 0.4-0.75 ppm.

35. The conditioning system of claim 33, wherein the amount of polymer added is sufficient to substantially clarify sidestream water prior to the sidestream water being circulated back to the system circulation.

36. The conditioning system of claim 33, wherein:
the sidestream water being circulated to the reaction chamber has a total hardness;
the system further comprises means for electronically measuring the hardness;
the sidestream water being circulated to the reaction chamber contains polymer-combinable particles, the particles interfering with the electronic hardness measurement accuracy and causing measurement inaccuracy; and
the amount of polymer added is sufficient to combine with and remove at least some of the interfering particles, such that the electronic hardness measurement accuracy is improved.

37. The conditioning system of claim 33, wherein:
the sidestream water being circulated back to the cooling water system from the reaction chamber has a total hardness;
the system further comprises means for chemically measuring the hardness;
the sidestream water being circulated back to the cooling water system from the reaction chamber contains polymer-combinable particles, the particles interfering with the chemical hardness measurement accuracy and causing measurement inaccuracy; and
the amount of polymer added is sufficient to combine with and remove at least some of the interfering particles, such that the chemical hardness measurement accuracy is improved.

38. The conditioning system of claim 33, wherein the polymer is pre-mixed with a polymer reaction accelerator additive.

39. The conditioning system of claim 38, wherein the additive is selected from the group consisting of aluminum sulfate, aluminum chloride, ferric sulfate, and ferric chloride.

40. The conditioning system of claim 33, wherein the means for adding a conditioner to the reaction chamber lower portion further comprises means for routing the conditioner through a conduit extending through at least a portion of the inlet, and the means for adding a polymer to the side stream water further comprises means for adding the polymer to the sidestream water in the reaction chamber inlet.

41. The conditioning system of claim 33, further comprising means for causing a swirling of the sidestream water as the sidestream water is routed through the reaction chamber upper portion.

42. The conditioning system of claim 28, wherein the means for adding a buffer to the sidestream water exiting the reaction chamber, further comprises means for adding a corrosion inhibitor blend to the buffer before the buffer is added to the sidestream water.

43. A conditioning system for conditioning water, the water being circulated in another system, the conditioning system comprising:
a reaction chamber;
conduit for establishing a circulated water sidestream, from the other system, to a reaction chamber, and back to the other system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion;
a buffer addition system for adding a buffer to the sidestream water exiting the reaction chamber, the buffer addition system further comprising a buffer supply comprising organic acid such that the pH of the sidestream water is lowered prior to returning to the other system circulation, at least some of the buffered sidestream water being recirculated in the sidestream;
a conditioner addition system for adding a conditioner to the reaction chamber lower portion, such that the pH of the sidestream water is elevated, the conditioner addition system further comprising a conditioner supply comprising caustic, the conditioner addition system further comprising a conditioner addition system conduit extending through at least a portion of the inlet, the conditioner flowing through the conditioner addition system conduit;
the conditioner and buffer being addable such that mixing of the conditioner, the buffer, and the sidestream water within the reaction chamber, causes solids to precipitate from the sidestream water such that the sidestream water exiting the reaction chamber has less dissolved solids than the sidestream water entering the reaction chamber; and
an outlet for removing precipitated solids, conditioner, buffer and some of the sidestream water from the reaction chamber for disposal.

44. The conditioning system of claim 43, wherein the reaction chamber lower portion has a bottom and the inlet discharges the sidestream water approximately 12 inches from the reaction chamber bottom.

45. The conditioning system of claim 43, wherein the discharged sidestream water circulates in a substantially circular, inwardly directed pattern about the inlet.

46. The conditioning system of claim 43, wherein the reaction chamber lower portion has a bottom, and the reaction chamber lower portion bottom is substantially flat.

47. The conditioning system of claim 43, wherein the reaction chamber lower portion has a bottom, and the reaction chamber lower portion bottom is substantially conical.

48. The conditioning system of claim 43, wherein the reaction chamber lower portion has a bottom, and the reaction chamber lower portion bottom is substantially convex.

49. The conditioning system of claim 43, wherein the inlet is configured to receive the sidestream water and induce a swirling of the sidestream water as the sidestream water is being routed through the reaction chamber upper portion.

50. The conditioning system of claim 43, further comprising a polymer addition system having a polymer supply, and a polymer delivery assembly, and wherein the inlet further comprises a port for receiving the polymer from the polymer delivery assembly for addition to the sidestream water in the inlet.

51. The conditioning system of claim 43, wherein the reaction chamber comprises an upper outlet for discharging the sidestream water back to the other system circulation, the conditioning system further comprising a pH sensor for monitoring the pH of the water returning to the other system circulation, and further wherein the buffer is added to the sidestream water between the reaction chamber and the pH sensor.

52. The conditioning system of claim 43, wherein the reaction chamber comprises a tank, the tank having an upper outlet through which sidestream water is discharged for returning to the other system circulation, and further wherein the buffer is added to the sidestream water proximate the tank upper outlet.

53. The conditioning system of claim 43, further comprising a polymer addition system for adding a polymer to the sidestream water.

54. The conditioning system of claim 53, wherein the amount of polymer added results in a polymer to sidestream water concentration in the range of 0.4-0.75 ppm.

55. The conditioning system of claim 53, wherein the amount of polymer added is sufficient to substantially clarify sidestream water prior to the sidestream water being circulated back to the system circulation.

56. The conditioning system of claim 53, wherein:
the sidestream water being circulated to the reaction chamber has a total hardness;
the conditioning system further comprises a hardness measurement assembly for electronically measuring the hardness;
the sidestream water being circulated to the reaction chamber contains polymer-combinable particles, the particles interfering with the electronic hardness measurement accuracy and causing measurement inaccuracy; and
the amount of polymer added is sufficient to combine with and remove at least some of the interfering particles, such that the electronic hardness measurement accuracy is improved.

57. The conditioning system of claim 53, wherein:
the sidestream water being circulated back to the cooling water system from the reaction chamber has a total hardness;
the conditioning system further comprises a sampling valve for obtaining sidestream water samples from sidestream water being circulated back to the cooling water system from the reaction chamber for chemically measuring the hardness;
the sidestream water being circulated back to the cooling water system from the reaction chamber contains polymer-combinable particles, the particles interfering with the chemical hardness measurement accuracy and causing measurement inaccuracy; and
the amount of polymer added is sufficient to combine with and remove at least some of the interfering particles, such that the chemical hardness measurement accuracy is improved.

58. The conditioning system of claim 53, wherein the polymer is pre-mixed with a polymer reaction accelerator additive.

59. The conditioning system of claim 58, wherein the additive is selected from the group consisting of aluminum sulfate, aluminum chloride, ferric sulfate, and ferric chloride.

60. The conditioning system of claim 53, wherein:
the conditioner addition system further comprises a conditioner addition system conduit extending through at least a portion of the inlet, the conditioner flowing through the conditioner addition system conduit;
the polymer addition system further comprises a polymer supply, and a polymer delivery assembly; and
the inlet further comprises a port for receiving the polymer from the polymer delivery assembly for addition to the sidestream water in the inlet.

61. The conditioning system of claim 53, wherein the inlet is configured to receive the sidestream water and induce a swirling of the sidestream water as the sidestream water is being routed through the reaction chamber upper portion.

62. The conditioning system of claim 43, wherein the reaction chamber is not internally pressurable.

63. The conditioning system of claim 43, wherein the reaction chamber is internally pressurable.

64. The conditioning system of claim 43, wherein the reaction chamber further comprises an upper outlet for discharging sidestream water back to the other system.

65. The conditioning system of claim 43, further comprising a drain for periodically draining part of the mixture of precipitated solids, conditioner, buffer, and some of the sidestream water from the reaction chamber.

66. The conditioning system of claim 43, wherein the buffer addition system accommodates a mixture of the buffer and a corrosion inhibitor blend, the mixture being dischargeable from the buffer addition system into the sidestream water.

67. A process for conditioning evaporative cooling water that is circulated in a cooling system of the type including a source of makeup water, an evaporative cooling unit and a heat exchanger piped together in a circulating line, the process comprising the steps of:
establishing an evaporative cooling water sidestream, from the cooling system, to a reaction chamber, and back to the cooling system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion;
adding a buffer comprising organic acid to the sidestream water exiting the reaction chamber, such that the pH of the sidestream water is lowered prior to returning to the cooling system circulation, at least some of the buffered sidestream water being recirculated in the sidestream;
adding conditioner comprising caustic to the reaction chamber lower portion, such that the pH of the sidestream water is elevated, the conditioner being routed through a conduit extending through at least a portion of the inlet;
the conditioner and buffer being added such that a fluid bed accumulates, settles and is maintained in the reaction chamber, the fluid bed having at least conditioner, buffer, and dissolved solids precipitated from the sidestream water, the fluid bed mixing and reacting with sidestream water entering the reaction chamber such that additional solids precipitate from the sidestream water, the sidestream water thus exiting the tank with reduced dissolved solids; and
removing a portion of the fluid bed from the reaction chamber for disposal.

68. A process for conditioning water, the water being circulated in a system, comprising the steps of:
establishing a circulated water sidestream, from the system, to a reaction chamber, and back to the system circulation, the reaction chamber having an upper portion, a lower portion, and an inlet, the inlet receiving the sidestream water, the inlet being configured to route the sidestream water through the reaction chamber upper portion and discharge the sidestream water in the reaction chamber lower portion, the inlet being further configured to cause a swirling of the sidestream water as the sidestream water is being routed through the reaction chamber upper portion;

adding a buffer comprising organic acid to the sidestream water exiting the reaction chamber, such that the pH of the sidestream water is lowered prior to returning to the system circulation, at least some of the buffered sidestream water being re-circulated in the sidestream;

adding a conditioner comprising caustic to the reaction chamber lower portion by routing the conditioner through a conduit extending through at least a portion of the inlet, such that the pH of the sidestream water is elevated;

adding a polymer to the sidestream water in the inlet;

adding a corrosion inhibitor blend to the sidestream water;

the conditioner and buffer being added such that mixing of the conditioner, the buffer and the sidestream water within the reaction chamber, causes solids to precipitate from the sidestream water such that the sidestream water exiting the reaction chamber has less dissolved solids than the sidestream water entering the reaction chamber; and removing precipitated solids, conditioner, buffer and some of the sidestream water from the reaction chamber for disposal.

* * * * *